(12) United States Patent
Tanaka et al.

(10) Patent No.: US 10,509,595 B2
(45) Date of Patent: Dec. 17, 2019

(54) SYSTEM AND METHOD FOR COMMUNICATION IN A SEMICONDUCTOR DEVICE

(71) Applicant: SYNAPTICS INCORPORATED, San Jose, CA (US)

(72) Inventors: Nobukazu Tanaka, Tokyo (JP); Takayuki Noto, Tokyo (JP); Masaaki Shiomura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 21 days.

(21) Appl. No.: 15/842,543

(22) Filed: Dec. 14, 2017

(65) Prior Publication Data

US 2018/0173465 A1 Jun. 21, 2018

(30) Foreign Application Priority Data

Dec. 19, 2016 (JP) .................................. 2016-245283

(51) Int. Cl.
| | |
|---|---|
| *G06F 13/24* | (2006.01) |
| *G06F 1/08* | (2006.01) |
| *G06F 3/06* | (2006.01) |
| *G06F 13/40* | (2006.01) |
| *G06F 3/0488* | (2013.01) |
| *G06F 9/4401* | (2018.01) |
| *G06F 3/041* | (2006.01) |
| *G09G 5/00* | (2006.01) |

(52) U.S. Cl.
CPC .......... *G06F 3/0659* (2013.01); *G06F 3/0412* (2013.01); *G06F 3/0416* (2013.01); *G06F 3/0488* (2013.01); *G06F 9/4411* (2013.01); *G06F 13/4022* (2013.01); *G09G 5/00* (2013.01); *G09G 5/006* (2013.01); *G09G 2330/026* (2013.01)

(58) Field of Classification Search
CPC ............................... G06F 1/3203; G06F 1/324
See application file for complete search history.

(56) References Cited

U.S. PATENT DOCUMENTS

2009/0157936 A1* 6/2009 Goss ..................... G06F 1/3203
710/264
2018/0004685 A1* 1/2018 Bhatt .................... G06F 13/102

FOREIGN PATENT DOCUMENTS

JP 2015169986 A 9/2015

* cited by examiner

*Primary Examiner* — Nan-Ying Yang
(74) *Attorney, Agent, or Firm* — Patterson + Sheridan, LLP

(57) ABSTRACT

A semiconductor device including a first data terminal, a data output terminal, a control circuitry, first and second communication interfaces, and a bridge circuitry. The bridge circuitry is configured to operate a normal mode and a bridge mode. In the normal mode, the data output terminal is connected to the second communication interface circuitry, and in the bridge mode, the first data terminal is connected to the data output terminal in a bridge mode.

20 Claims, 15 Drawing Sheets

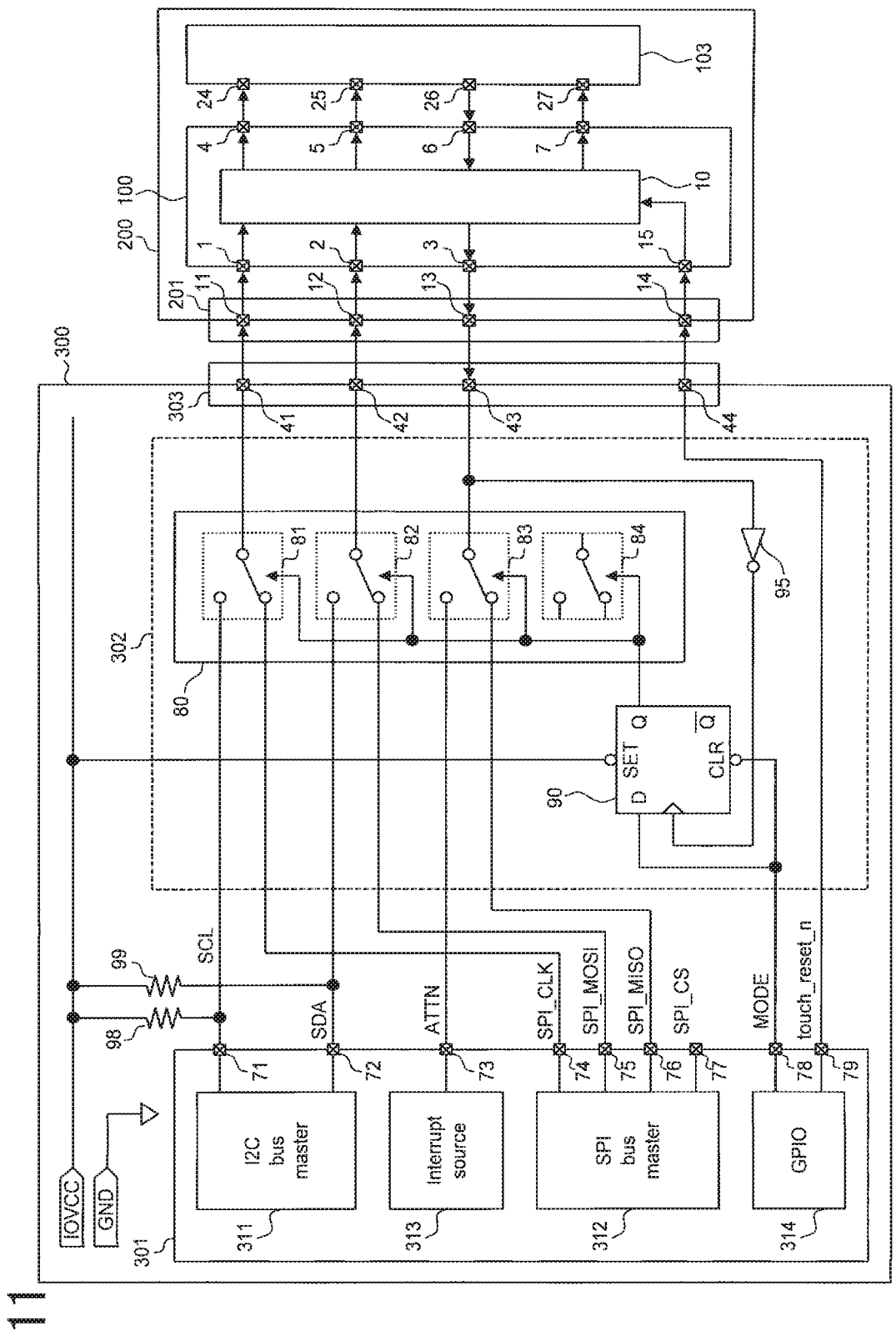
F I G. 11

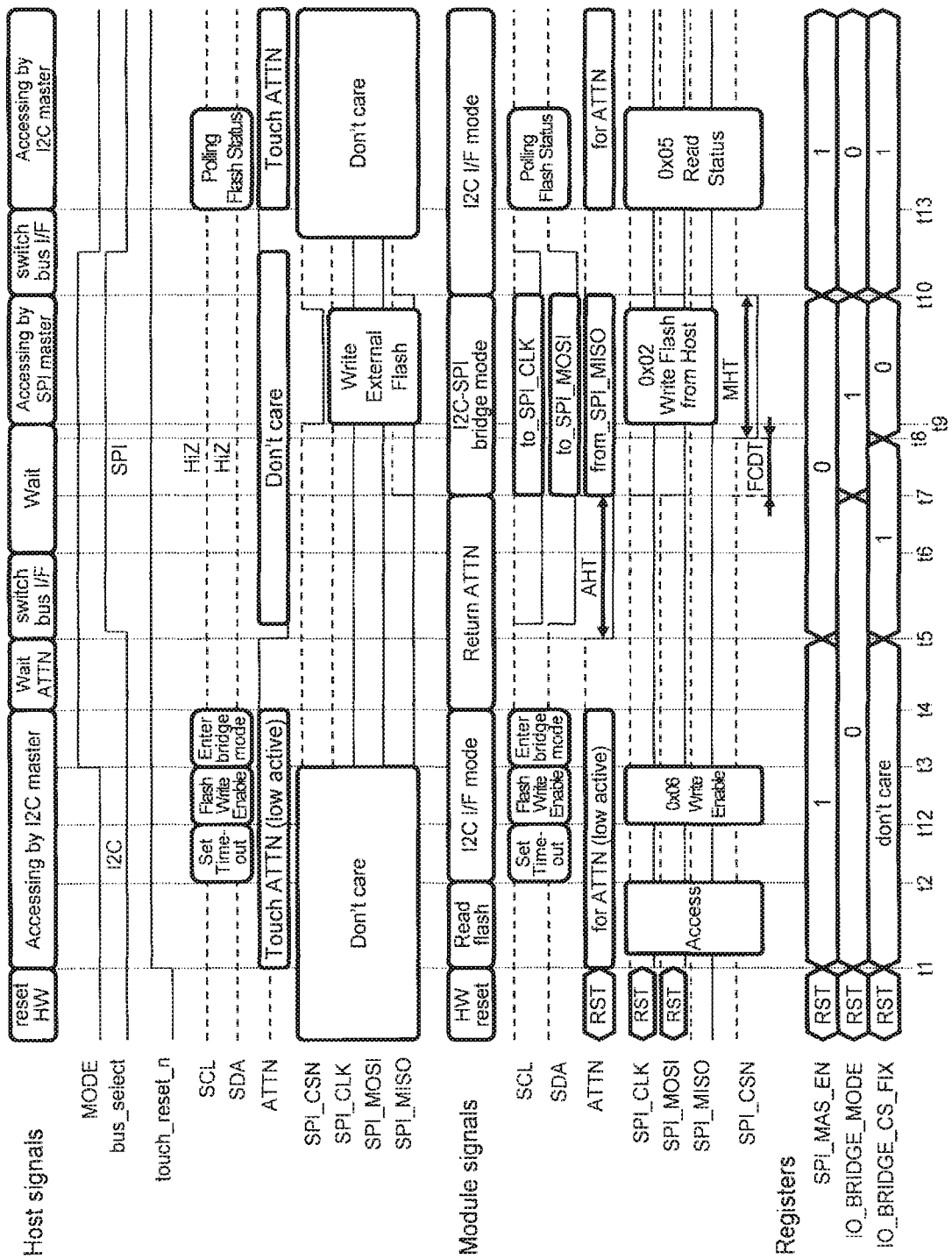

SYSTEM AND METHOD FOR COMMUNICATION IN A SEMICONDUCTOR DEVICE

CROSS REFERENCE

This application claims priority of Japanese Patent Application No. 2016-245283, filed on Dec. 19, 2016, the disclosure of which is incorporated herein by reference.

TECHNICAL FIELD

The present disclosure relates to a semiconductor device, a human interface device and an electronic appliance, more particularly, to a system configuration in which a non-volatile memory is externally connected to a semiconductor device.

BACKGROUND ART

Smartphones and tablet devices have become popular with a remarkable tendency of higher definition of image displaying and higher functionality of touch sensing. In many implementations, smartphones and tablet devices include a display touch panel having control circuitry which may include a plurality of integrated controllers (ICs). For example, control circuitry may include one or more of a display driver, a touch controller and a sequence controller or a monolithic IC incorporating the same. A sequence controller may be implemented as a microcontroller and may be configured to perform setting of parameters of gamma correction to the display driver, and execution of a program to calculate the touch coordinates from data obtained from the touch controller.

In many current implementations, a display driver includes a sub-processor which performs setting various parameters onto the display driver and the touch panel controller by executing programs. The programs and parameters are supplied from the main controller to the sub-processor.

In various embodiments, the types and numbers of parameters and the sizes of the programs tend to be increased due to higher definition of image displaying and higher functionality of touch sensing. This considerably increases the communication traffic between the sub-processor and the main controller, causing an increase in the communication time or an increase in the cost to reinforce the communication interface. Hence, there is a need for a display driver having decreased communication time and/or communication interface requirements between components of the display driver.

SUMMARY

In one embodiment, a semiconductor device comprises a first data terminal, a data output terminal, a control circuitry a first communication interface circuitry, a second communication circuitry and a bridge circuitry. The first data terminal is configured to connect to an external control device. The data output terminal is configured to connect to a non-volatile memory. The control circuitry is configured to control a human interface panel. The first communication circuitry is configured to provide first serial communication between the control circuitry and the external control device. The second communication interface circuitry configured to provide second serial communication between the control circuitry and the non-volatile memory. The bridge circuitry configured to, in a normal mode, connect the first data terminal to the first communication interface circuitry, and connect the data output terminal to the second communication interface circuitry, and, in a bridge mode, connect the first data terminal to the data output terminal.

In one embodiment, a human interface device comprises a human interface panel, a non-volatile memory, and a semiconductor device. The human interface panel comprises at least one of a display panel, a touch panel and a display touch panel. The semiconductor device comprises a first data terminal configured to connect to an external control device, a data output terminal configured connected to the non-volatile memory, a control circuitry configured to control the human interface panel, a first communication interface circuitry configured to provide first serial communication between the control circuitry and the external control device, a second communication interface circuitry configured to provide second serial communication between the control circuitry and the non-volatile memory, and a bridge circuitry configured to, in a normal mode, connect the first data terminal to the first communication interface circuitry, and connect the data output terminal to the second communication interface circuitry, and, in a bridge mode, connect the first data terminal to the data output terminal.

In one embodiment, an electronic appliance comprises a host-side connector, a host-side bridge circuitry, a main controller comprising, and a human interface device. The main controller comprises a first host-side data terminal used for the first serial communication with the semiconductor device, and a host-side data output terminal used for third serial communication with the non-volatile memory in accordance with a same communication specification as the second serial communication, wherein the host-side bridge circuitry is configured to connect the first-host side data terminal to the first data terminal of the semiconductor device in the normal mode, and wherein the host-side bridge circuitry is configured to electrically connect the host-side data output terminal to the first data terminal of the semiconductor device in the bridge mode. The human interface device comprises a human interface panel comprising at least one of a display panel, a touch panel and a display touch panel; a non-volatile memory, and a semiconductor device. The semiconductor device is connected to the human interface panel, the non-volatile memory, the main controller connected via the host-side connector, and the host-side bridge circuitry, The semiconductor device comprises a first data terminal connected to the host-side connector, a data output terminal connected to the non-volatile memory, a control circuitry, a first communication interface circuitry configured to provide first serial communication between the control circuitry and the external control device, and a second communication interface circuitry configured to provide second serial communication between the control circuitry and the non-volatile memory, and a module-side bridge circuitry configured to, in a normal mode, connect the first data terminal to the first communication interface circuitry and connect the data output terminal to the second communication interface circuitry, and, in a bridge mode wherein, connect the first data terminal to the data output terminal.

BRIEF DESCRIPTION OF THE DRAWINGS

FIG. 11 is a block diagram illustrating a configuration example of a host-side board according to one or more embodiments of the disclosure;

FIG. 15 is a timing chart illustrating an operation example of an electronic appliance according to one or more embodiments of the disclosure.

DETAILED DESCRIPTION

In the following, various embodiments are described in detail.

Figure 1:
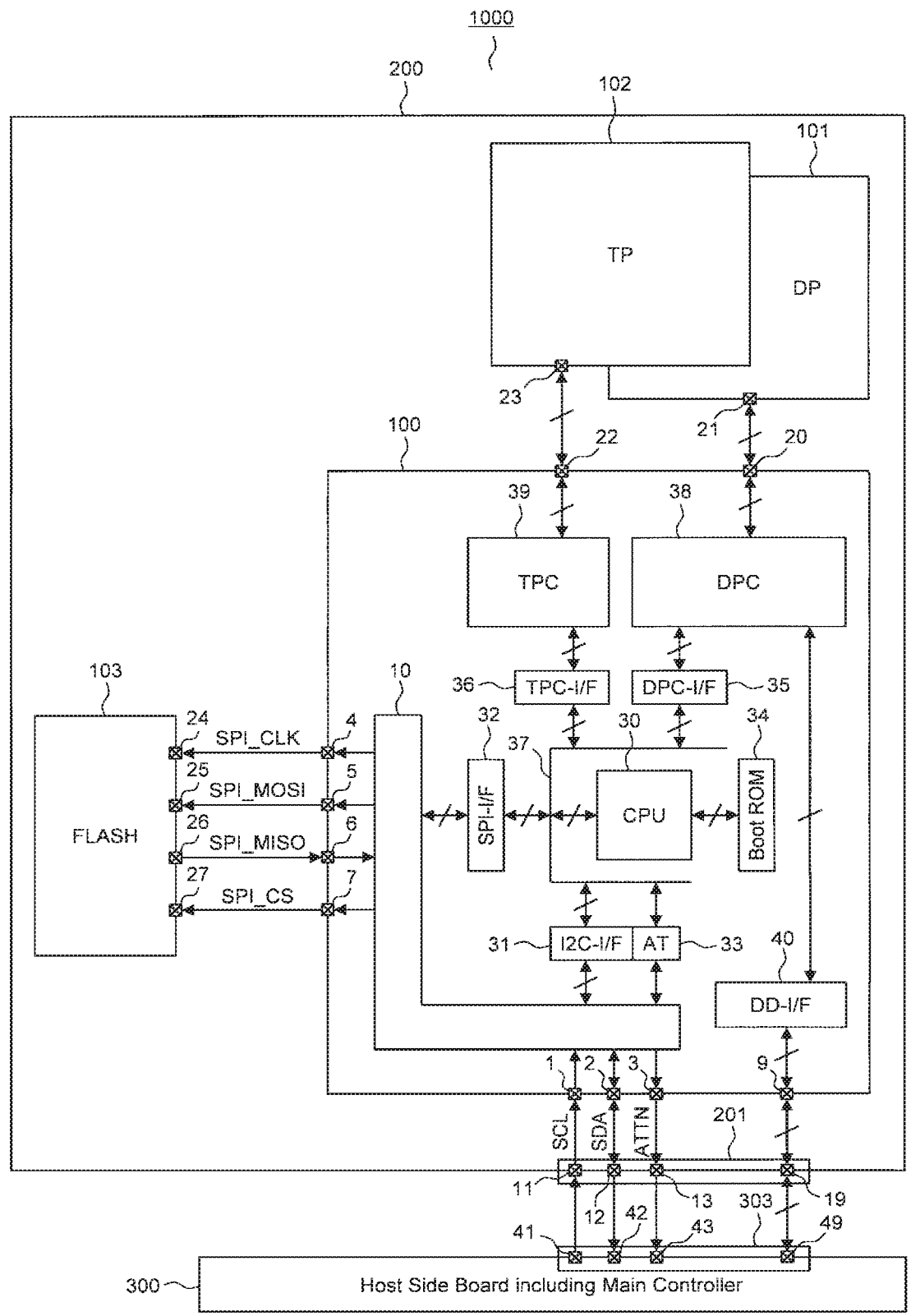
FIG. 1 is a block diagram illustrating a configuration example of an electronic appliance according to one or more embodiments of the disclosure.

FIG. 1 is a block diagram illustrating a configuration example of an electronic appliance 1000 in accordance with one or more embodiments.

The electronic appliance 1000 includes a human interface device and a host-side board 300. The human interface device 200 referred to herein collectively denote a display, a touch sensor and the like. The human interface device 200 may include a human interface panel, a semiconductor device 100 which includes an controller IC controlling the human interface panel, and a non-volatile memory 103 (e.g., an SPI flash memory) connected to the semiconductor device. Further, the human interface panel may include at least one of a display panel 101, a touch panel 102 and a display panel integrated with a touch panel and adapted for both image displaying and touch sensing. The host-side board 300 operates as a circuit device connected to the human interface device 200 to control the same. The host-side board 300 includes a main controller 301, which is not illustrated in FIG. 1. The human interface device 200 and the host-side board 300 include a module-side connector 201 and a host-side connector 303, respectively, and are electrically connected by coupling the module-side connector 201 and the host-side connector 303.

The semiconductor device 100 includes a first clock terminal 1, a first data terminal 2, an interrupt request terminal 3, a second clock terminal 4, a data output terminal 5, a data input terminal 6, and a chip select terminal 7. The first clock terminal 1 and the first data terminal 2 are used for first serial communication with the main controller 301. The second clock terminal 4, the data output terminal 5, the data input terminal 6, and the chip select terminal 7 are used for second serial communication with the non-volatile memory 103.

In various embodiments, the first serial communication may be serial communication of a relatively low speed over a two-line communication path including one clock signal line and one data signal line. For example, the communication path may be implemented via an I2C (inter-integrated circuit) communication. In one or more embodiments, the second serial communication may be serial communication of a relatively high speed over a three-line communication path including one clock signal line, one uplink data signal line and one downlink data signal line. For example, the second serial communication may be implemented via a SPI (serial peripheral interface) communication.

FIG. 1 illustrates an embodiment in which the first serial communication is achieved with an I2C communication, and the second serial communication is achieved with an SPI communication.

In an embodiment employing I2C communication as the first serial communication, the host-side board 300 operates as a master and the human interface device 200 (which may be also referred to as the module side, hereinafter) operates as a slave. The first clock terminal 1 of the semiconductor device 100 is configured to receive a serial clock SCL, and the first data terminal 2 is configured to transfer serial data SDA between the semiconductor device 100 and the host-side board 300. The interrupt request terminal 3 is configured to transmit an interrupt request signal ATTN from the semiconductor device 100 to the main controller 301. The human interface device 200 includes a serial clock terminal 11, a data transfer terminal 12, and an interrupt request terminal 13 connected to the first clock terminal 1, the first data terminal 2 and the interrupt request terminal 3, respectively, in the module-side connector 201.

In embodiments employing SPI communication as the second serial communication, the semiconductor device 100 operates as a master and the non-volatile memory 103 operates as a slave. The second clock terminal 4 of the semiconductor device 100 is used for supplying a serial clock SPI_CLK of the SPI communication, and connected to a terminal 24 of the non-volatile memory 103. The data output terminal 5 of the semiconductor device 100 is used for transferring serial data SPI_MOSI (master out/slave in) from the master to the slave in the SPI communication, and connected to a terminal 25 of the non-volatile memory 103. The data input terminal 6 of the semiconductor device 100 is used for transferring serial data SPI_MISO (master in/slave out) from the slave to the master in the SPI communication and connected to a terminal 26 of the non-volatile memory 103. The chip select terminal 7 of the semiconductor device 100 is used for supplying a chip select signal SPI_CS to enable the non-volatile memory 103, which operates as the slave of the SPI communication, and connected to a terminal 27 of the non-volatile memory 103.

In one or more embodiments, the semiconductor device 100 includes: a CPU 30 which operates as a control circuitry, a first communication interface circuitry 31, a second communication interface circuitry 32, an interrupt request circuitry 33, and a bridge circuitry 10. The semiconductor device 100 further includes: a display panel controller 38, a display panel controller control signal interface circuitry 35, a touch panel controller 39, a touch panel controller control signal interface 36, a boot ROM 34 and a display data interface 40.

In various embodiments, the semiconductor device 100 includes display panel terminals 20 and touch panel terminals 22, and connected to display panel terminals 21 of the display panel 101 and touch panel terminals 23 of the touch panel 102.

In one or more embodiments, the semiconductor device 100 includes display data transfer terminals 9 and connected to the host-side board 300 via terminals 19 of the module-side connector 201. Transfer of display data may be achieved over a communication path adapted to the MIPI-DSI (Mobile Industry Processor Interface-Display Serial Interface) specification, for example, which is provided separately from the above-described first and second serial communications, to achieve high-speed transfer of a large amount of display data.

The CPU 30, which operates as a control circuitry, is connected to the first communication interface circuitry 31, the second communication interface circuitry 32, the interrupt request circuitry 33, the boot ROM 34, the display panel controller control signal interface circuitry 35, and the touch panel controller control signal interface 36 via a bus 37.

In one embodiment, the display panel controller 38 is configured to hold various parameters supplied and set thereto from the CPU 30 via the display panel controller control signal interface circuitry 35 and drive the display panel 101 to display an image in accordance with control commands supplied from the CPU 30. Further, the display panel controller 38 may be configured to drive the display panel 102 via the display panel terminals 20 and 21 in response to display data received from the host-side board 300 via the terminals 19 of the module-side connector 201, the display data transfer terminals 9 and the display data interface 40.

The touch panel controller 39 may be configured to store therein various parameters supplied and set thereto from the CPU 30 via the touch panel controller control signal interface 36 and achieve touch sensing of the touch panel 102 in accordance with control commands supplied from the CPU 30. Further, the touch panel controller 39 may be configured to receive touch sensing information received from the touch panel 102 via the touch panel terminals 23 and 22 and supply digital data corresponding to the touch sensing information to the CPU 30 via the touch panel controller control signal interface 36. The CPU 30 may be configured to perform touch sensing operation, which may include calculation of the touch coordinates from the received digital data, and output the result of touch sensing to the host-side board 300 via the first communication interface circuitry 31. Since the CPU 30, which operates as the slave in the I2C communication, cannot issue an access request to the host-side board 300, which operates as the master, the function of issuing an access request is complemented by issuing an interrupt request via the interrupt request circuitry 33.

In one or more embodiments, various parameters set to the display panel controller 38 and/or the touch panel controller 39 and programs executed by the CPU 30 are stored in the non-volatile memory 103. The CPU 30 may be connected to the boot ROM 34 and configured to execute a boot program upon power-on. Further, the CPU 30 may be configured to read out various parameters from the non-volatile memory 103 and implement initial settings of the display panel controller 38 and the touch panel controller 39 with based on the read out parameters. Further, the CPU 30 may be configured to boot the programs stored in the non-volatile memory 103.

The semiconductor device 100 may further include a bridge circuitry 10. In addition to the normal mode described above, the semiconductor device 100 has a bridge mode in which the main controller 301 of the host-side board 300 is configured to directly access the non-volatile memory 103, bypassing the CPU 30.

In one or more embodiments, the bridge circuitry 10 is configured to operate in at least one of a normal mode and a bridge mode. In a normal mode, the bridge circuitry 10 is configured to connect the first clock terminal 1 and the first data terminal 2 to the first communication interface circuitry 31, connect the second clock terminal 4, the data output terminal 5, the data input terminal 6 and the chip select terminal 7 to the second communication interface circuitry 32, and connect the interrupt request terminal 3 to the interrupt request circuitry 33.

Furthermore, the bridge circuitry 10 is configured to, in a bridge mode, connect the first clock terminal 1 to the second clock terminal 4, connect the first data terminal 2 to the data output terminal 5, connect the interrupt request terminal 3 to the data input terminal 6, and output a signal level to the chip select terminal 7 to select the non-volatile memory 103.

This configuration allows the main controller 301, which is an external control device, to achieve a high-speed access to the non-volatile memory 103 in the bridge mode. The non-volatile memory 103 may be initialized with no data written into the non-volatile memory 103 just after the components of the device have been assembled. This is because parameters for compensating the individual differences (manufacture variations) of the display panel 101 and the touch panel 102 are to be written into the non-volatile memory 103, and it is therefore more convenient to write correction parameters and compensation parameters calculated through tests after the assembly of the components. When the main controller 301 of the host-side board 300 accesses the non-volatile memory 103 via the first communication interface circuitry 31 and the second communication interface circuitry 32, the data transfer rate is restricted by the lower speed of the first serial communication (I2C communication in this example). In various embodiments, the bridge mode allows an access to the non-volatile memory 103 at the higher data transfer rate of the second serial communication, by establishing direct electrical connections between the relevant terminals with the bridge circuitry 10 and by forwarding signals of the second serial communication to the communication path of the first serial communication without performing protocol conversion.

In many embodiments, using the host-side board 300 as a test bench of the human interface device 200 allows largely reducing the duration of time during which various parameters and programs are written into the non-volatile memory 103 in a before-shipment test of the human interface device 200.

In one embodiment, a main board of the electronic appliance 1000 in which the human interface device 200 is assembled may be used as the host-side board 300, and an application processor may be used as the main controller 301. In this case, the duration of time during which a program of the CPU 30 stored in the non-volatile memory 103 is rewritten is largely reduced, when the program is to be updated.

Although FIG. 1 illustrates the example in which the display touch module which includes the display panel 101 and the touch panel 102 is used as the human interface device 200, this is merely one example. A display touch panel in which a display panel and a touch panel are integrated in an in-cell configuration (e.g., the touch panel and display panel share at least one element) or on-cell configuration (e.g., one or more elements of the touch panel is disposed on one or more elements of the display panel) may be used in place of the display panel 101 and the touch panel 102. Alternatively, a display device or a touch sensor, which includes only one of a display panel and a touch panel, may be used as the human interface device 200. The configuration illustrated in FIG. 1 may be applied to other electronic appliances which are configured similarly.

Figure 2:
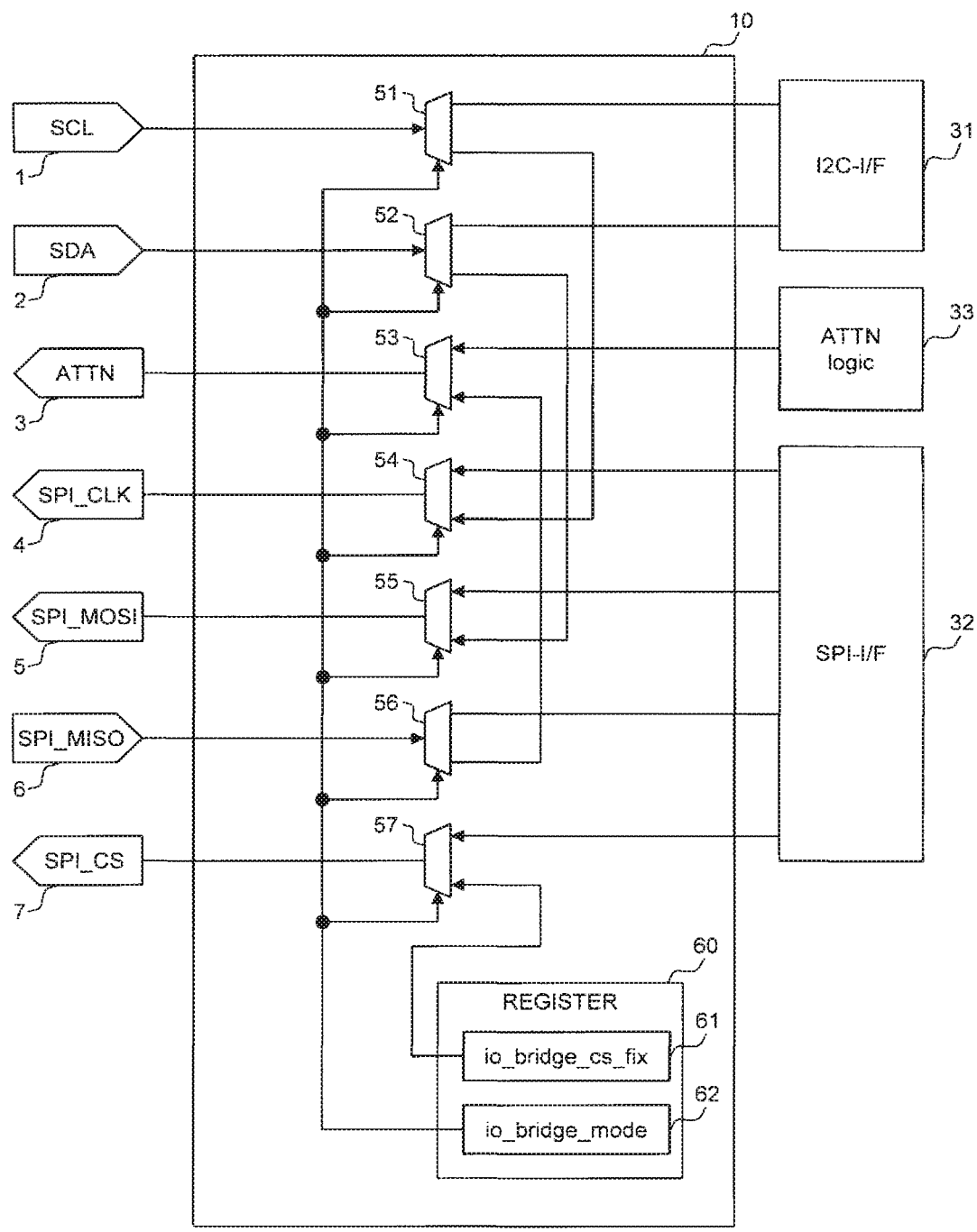
FIG. 2 is a block diagram illustrating a configuration example of a bridge circuitry according to one or more embodiments of the disclosure.

FIG. 2 is a block diagram illustrating a configuration example of the bridge circuitry 10. In one embodiment, the bridge circuitry 10 includes a register and one or more switches. For example, The bridge circuitry 10 includes a register 60 and seven switch circuitries 51 to 57. The register 60 may include a chip select level setting register 61, which is also denoted by the legend "io_bridge_cs_fix" in FIG. 2, and a bridge mode setting register 62, which is also denoted by the legend "io_bridge_mode". In one embodiment, the register 60 may be configured to be accessible via the bus 37 from the CPU 30.

The bridge mode setting register 62 specifies the operation mode of the bridge circuitry. For example, the operation modes may be a normal mode and a bridge mode.

In the normal mode, the bridge circuitry 10 is configured to connect the first clock terminal 1 and the first data terminal 2 to the first communication interface circuitry 31 by the switches 51 and 52, respectively, and connect the output of the interrupt request circuitry 33 to the interrupt request terminal 3 by the switch 53. Furthermore, the bridge circuitry 10 may be configured to connect the outputs of the second communication interface circuitry 32 to the second clock terminal 4, the data output terminal 5 and the chip select terminal 7, respectively, by the switches 54, 55 and 57, and supply the input from the data input terminal 6 to the second communication interface circuitry 32 via the switch 56.

In the bridge mode, the bridge circuitry 10 is configured to output the input from the first clock terminal 1 to the second clock terminal 4 via the switches 51 and 54, and output the input from the first data terminal 2 to the data output terminal 5 via the switches 52 and 55. Furthermore, the bridge circuitry 10 may be configured to output the input from the data input terminal 6 to the interrupt request terminal 3 via the switches 56 and 53, and output the value held by the chip select level setting register 61 to the chip select terminal 7.

In embodiments in which The bridge circuitry 10 is configured as a switch circuitry, allows forwarding electrical signals to terminals of a different communication interface without modification. In such embodiments, the communication protocol is not converted and a high speed access to the non-volatile memory 103 for the main controller 301 is provided by adding a circuitry of a minimized size without increasing the number of terminals of the connectors.

Figure 3:
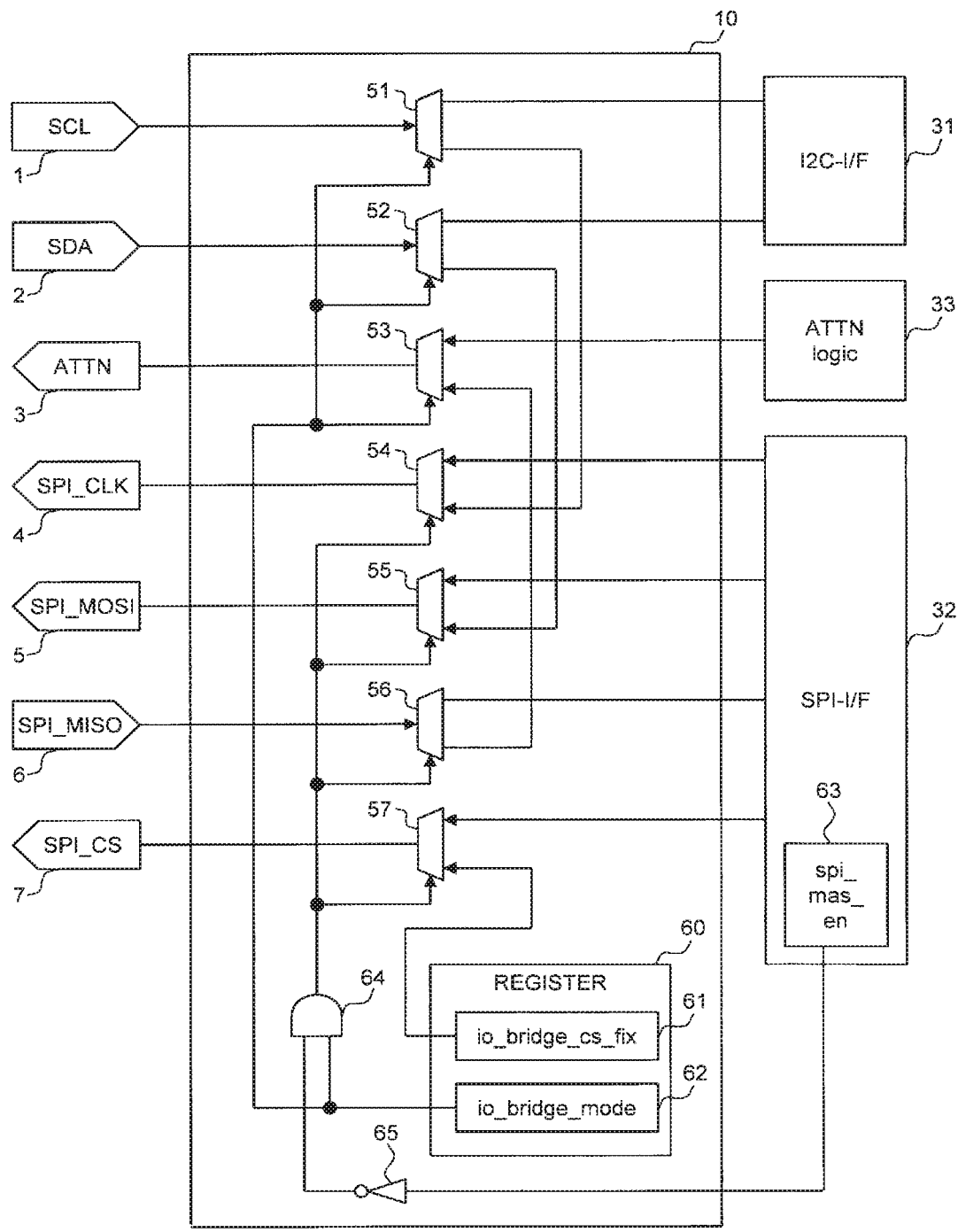
FIG. 3 is a block diagram illustrating the configuration of a modification of the bridge circuitry according to one or more embodiments of the disclosure.

FIG. 3 is a block diagram illustrating the configuration of another embodiment of the bridge circuitry 10. As compared to the embodiment of FIG. 2, the bridge circuitry 10 illustrated in the embodiment of FIG. 3 includes an AND gate 64 and an inverter 65 and separately performs the control of the switches 51 to 53 and the control of the switches 54 to 57. The second communication interface circuitry 32 includes an SPI master enable register 63 which is set when the second communication interface circuitry 32 is enabled, and the output signal of the SPI master enable register 63 is supplied to the bridge circuitry 10. The SPI master enable register 63 is also denoted by the legend "spi_mas_en" in FIG. 3. The rest of the embodiment of FIG. 3 may be implemented to that of the embodiment illustrated in FIG. 2.

The control of the switches 51 to 53 is responsive to the state of the bridge mode setting register 62, as is the case with that illustrated and described within the embodiment of FIG. 2. In one embodiment, the control of the switches 54 to 57 is based on the value set to the SPI master enable register 63 for performing the operation in the bridge mode in response to the state of the bridge mode setting register 62 as is described with the embodiment of FIG. 2. In various embodiments, the control of switches 51 to 53 is provided with priority access to the non-volatile memory 103 from the second communication interface circuitry 32, via the second clock terminal 4, the data output terminal 5, the data input terminal 6, and the chip select terminal 7.

In various embodiments, when the value set to the SPI master enable register 63 is the low level, indicating that the communication interface circuitry 32 is disabled; the switches 54 to 57 are controlled to achieve the operation of the bridge mode in a similar way as is described in the embodiment of FIG. 2. For example, the switches 54 to 57 may be controlled in response to the operation mode set to the bridge mode setting register 62. In various embodiments, when the value set to the SPI master enable register 63 is a high level, which indicates the enable of the second communication interface circuitry 32, the second clock terminal 4, the data output terminal 5, the data input terminal 6 and the chip select terminal 7 are connected to the second communication interface circuitry 32 with the switches 54 to 57, regardless of the operation mode set to the bridge mode setting register 62.

The configuration of the logic circuitry including the AND gate 64 and the inverter 65 illustrated in FIG. 3 is based on an embodiment in which the value of the SPI master enable register 63 is defined in the positive logic and the switches 54 to 57 are controlled to achieve the connections in the bridge mode when the control signal supplied to the switches 54 to 57 are set to the high level. The configuration of the logic circuitry may be appropriately modified depending on whether the value of the SPI master enable register 63 is defined in the positive logic or negative logic.

When the second communication interface circuitry 32 is enabled while the semiconductor device 100 is placed in the bridge mode, the priority is given to the access via the second communication interface circuitry 32, and thereby the operation of the access entity which has enabled the second communication interface circuitry 32 is secured without being hindered by the bridge mode. For example, when commands received by the semiconductor device 100 illustrated in FIG. 1 from the display data transfer terminals 9 include a command which instructs to read a parameter stored in the non-volatile memory 103 and set the parameter to the display panel controller 38, the priority is given to the access to the non-volatile memory 103 from the CPU 30 via the second communication interface circuitry 32, even when the semiconductor device 100 is operated in the bridge mode. In such embodiments, the appropriate image displaying operation is maintained without hindering the drive of the display panel 101 by the display panel controller 38.

Figure 4:
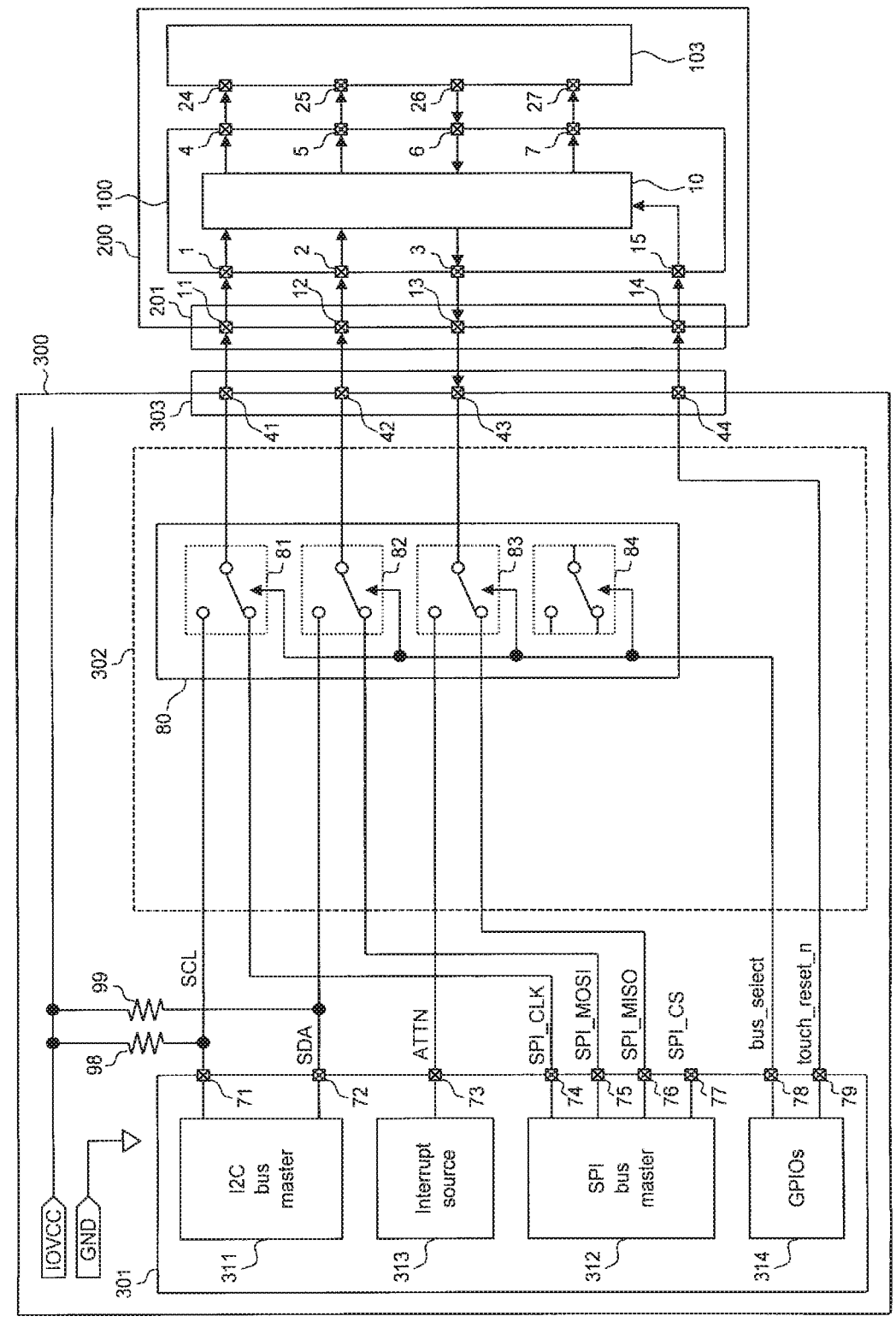
FIG. 4 is a block diagram illustrating a configuration example of a host-side according to one or more embodiments of the disclosure.

FIG. 4 is a block diagram illustrating an embodiment of a configuration of the host-side board 300 in the first embodiment. The host-side board 300 includes a main controller 301, a host-side bridge circuitry 302 and a host-side connector 303. The host-side connector 303 is connected to the module-side connector 201 of the human interface device 200, and this provides an access to the non-volatile memory 103 in the human interface device 200 via the bridge circuitry 10 in the semiconductor device 100 from the main controller 301 on the host-side board 300.

In one or more embodiments, the host-side connector 303 may include a terminal 41 corresponding to the first clock terminal 1 and the serial clock terminal 11 of the human interface device 200, a terminal 42 corresponding to the first data terminal 2 and the data transfer terminal 12 of the human interface device 200, an interrupt request reception terminal 43 corresponding to the interrupt request terminals 3 and 13 of the human interface device 200, a reset terminal 44 and display data transfer terminals 49.

In various embodiments, the main controller 301 includes a first communication interface circuitry 311 used for the first serial communication (e.g. the I2C communication) with the semiconductor device 100, a third communication interface circuitry 312 used for a third serial communication with the non-volatile memory 103 in accordance with the same communication specification as the second serial communication (e.g., the SPI communication), an interrupt control circuitry 313 configured to receive the interrupt request signal ATTN from the semiconductor device 100 and a general-purpose input/output (GPIO) port 314. In FIG. 4, the first communication interface circuitry 311 is also denoted by the legend "I2C bus master", the third communication interface circuitry 312 is also denoted by the legend "SPI bus master", and the interrupt control circuitry 313 is also denoted by the legend "interrupt source". The main controller 301 further includes a first host-side clock terminal 71, a first host-side data terminal 72, an interrupt request reception terminal 73, a second host-side clock terminal 74, a host-side data output terminal 75, a host-side data input terminal 76, a host-side chip select terminal 77, and general-purpose output terminals 78 and 79. The first host-side clock terminal 71 and the first host-side data terminal 72 are connected to the first communication interface circuitry 311. The interrupt request reception terminal 73 is configured to receive an interrupt request. The second host-side clock terminal 74, the host-side data output terminal 75, the host-side data input terminal 76, and the host-side chip select terminal 77 are connected to the third communication interface circuitry 312.

FIG. 4 illustrates an embodiment in which the bridge circuitry 302 includes a general-purpose analog switch IC 80. In such an embodiment, a general-purpose IC incorporating four single pole double throw switches 81 to 84 is used as the analog switch IC 80. Three of the four switches, that is, the switches 81 to 83 are used and the switch 84 is not used. This is because general-purpose ICs in which 2" switches, such as two, four and eight switches, are integrated are commonly available, where n is a natural number. The main controller 301 outputs a bus select signal bus_select and a reset signal touch_reset_n from the general-purpose output terminals 78 and 79 of the general purpose IO port 314, respectively. The bus select signal bus_select is supplied to the switch control terminal of the general-purpose analog switch IC 80 to control the switches 81 to 84. When the bus select signal bus_select indicates the normal mode, the switches 81 to 83 connects the first host-side clock terminal 71, the first host-side data terminal 72 and the interrupt request reception terminal 73 to the terminals 41, 42 and 43 of the connector 303, respectively. When the bus select signal bus_select indicates the bridge mode, on the other hand, the switches 81 to 83 connects the second host-side clock terminal 74, the host-side data output terminal 75 and the host-side data input terminal 76 of the third communication interface circuitry 312 to the terminals 41, 42 and 43 of the connector 303, respectively.

In such embodiments, the terminals of the low speed I2C bus are also used as the terminals of the high speed SPI bus in the bridge mode, and this provides a high speed access to the non-volatile memory 103 from the main controller 301 without increasing the number of terminals of the connectors 201 and 303.

Although the description has been given in the above with examples in which the I2C communication is used as the first serial communication and the SPI communication is used as the second and third serial communications, the technique disclosed in this embodiment is generally applicable to a system in which two-line serial communication of relatively low speed is used as the first serial communication, and three-line serial communication of relatively high speed is used as the second and third serial communications. The described techniques reduce complexity by generating a chip select signal in the bridge circuitry 10 in the human interface device 200, not transferring the chip select signal of the third serial communication.

In the following, the operation of the electronic appliance 1000 is described.

Described below is an example embodiment in which no data is written into the non-volatile memory 103. In such an embodiment, the CPU 30 places the semiconductor device 100 into the bridge mode by executing the boot program stored in the boot ROM 34 and the main controller 301 on the host-side board 300 writes data into the non-volatile memory 103 in the human interface device 200.

Figure 5:
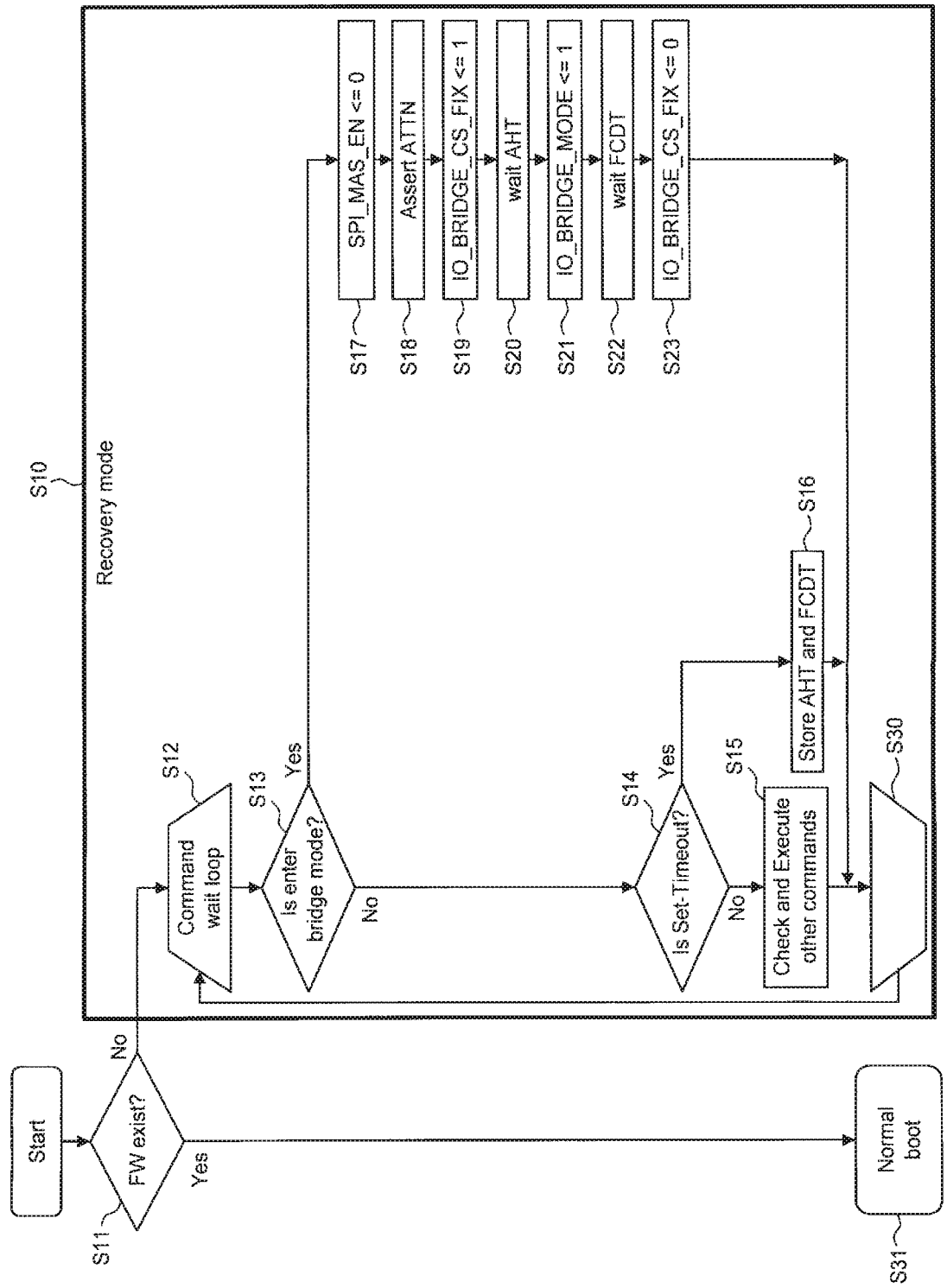
FIG. 5 is a flowchart illustrating an operation example of the semiconductor device when the boot program is executed according to one or more embodiments of the disclosure.
Figure 6:
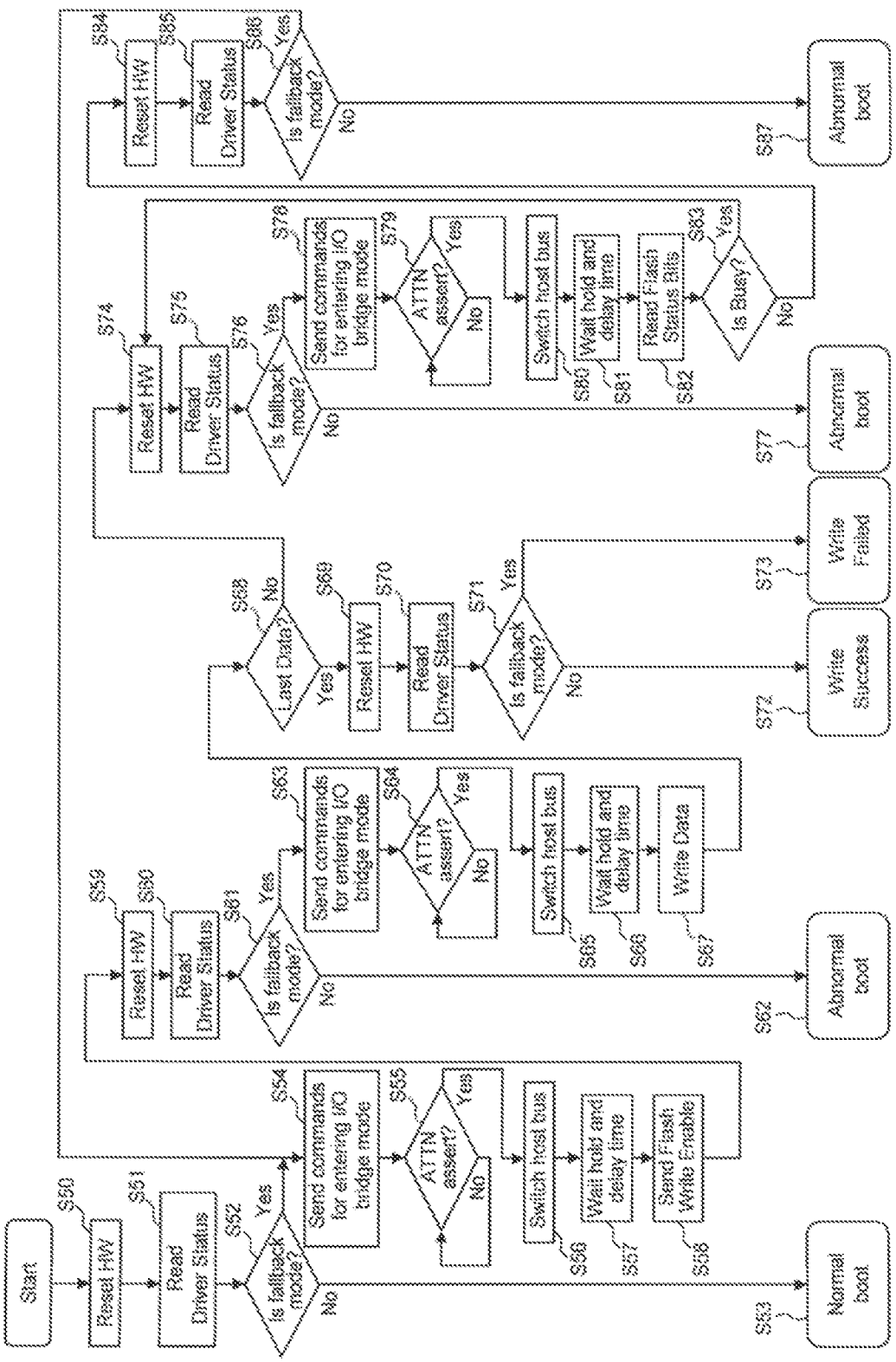
FIG. 6 is a flowchart illustrating an operation example of a host-side main controller in controlling the bridge circuitry according to one or more embodiments of the disclosure.
Figure 7:
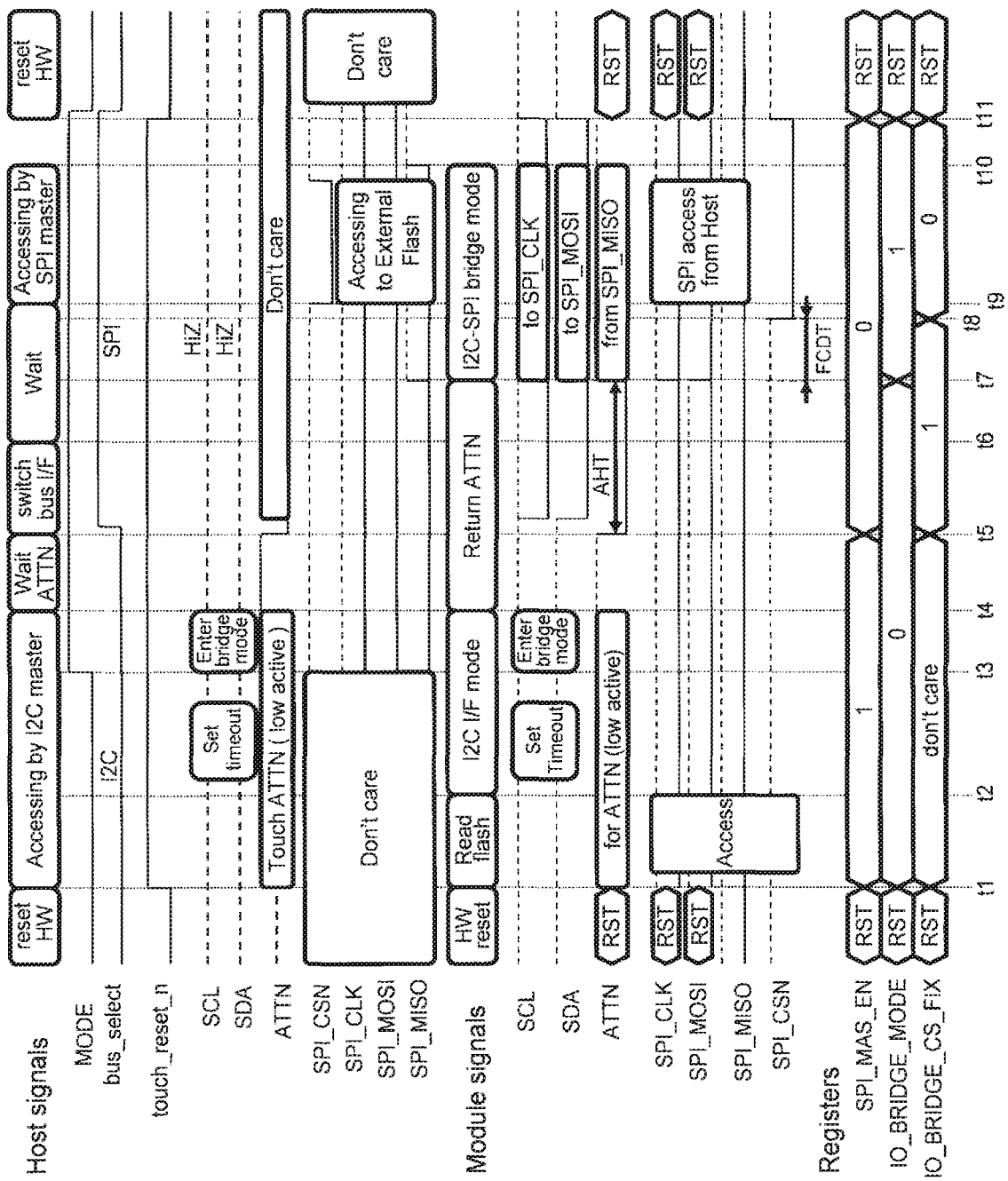
FIG. 7 is a timing chart illustrating an operation example of the electronic appliance according to one or more embodiments of the disclosure.

FIG. 5 is a flowchart illustrating an operation example of the semiconductor device 100 when the boot program is executed, and FIG. 6 is a flowchart illustrating an operation example of the host-side main controller 301 in controlling the bridge circuitry 302. FIG. 7 is a timing chart illustrating an embodiment of the operations of the semiconductor device 100 and the host-side main controller 301. FIG. 7 illustrates, from the top, the signals generated in the host-side board 300 (indicated by the legend "Host signals"), the signals generated in the human interface device 200 (indicated by the legend "Module signals") and the register values (indicated by the legend "Registers").

As illustrated in FIG. 6, after terminating the hardware reset (S50) of the semiconductor device 100 at time t1, the host-side board 300 sets the bus select signal bus_select to select the I2C communication, and performs the I2C communication with the first communication interface circuitry 311 via the first host-side clock terminal 71, the serial clock terminal 11, the first clock terminal 1, the first host-side data terminal 72, the data transfer terminals 12, 2, the interrupt request reception terminal 73 and the interrupt request terminals 13 and 3 to read out the status of the semiconductor device 100 from time t1 to t2 (S51).

Meanwhile, the semiconductor device 100 starts executing the boot program, and accesses to the non-volatile memory 103 via the second clock terminal 4, the data output terminal 5, the data input terminal 6 and the chip select terminal 7, to thereby check whether or not data such as firmware have been already written into the non-volatile memory 103 (S11) as illustrated in FIG. 5. When the data such as firmware have been already written, the semiconductor device 100 goes to a normal boot (S31). When no data has been written, the semiconductor device 100 goes to a recovery mode (S10) and the procedure enters a command waiting loop (S12 to S30).

In various embodiments, the host-side board 300 goes to a normal boot (S53) when the status of the semiconductor device 100 is not in a fallback mode. When the semiconductor device 100 is in the fallback mode, the host-side board 300 subsequently issues a command to enter the bridge mode (S54) from time t2 to t4 by the first communication interface circuitry 311 after setting timeout, and then enters a loop for waiting an interrupt request signal ATTN from the semiconductor device 100 (S55) from time t4 to t5.

While being placed in the command waiting loop (S12 to S30), the semiconductor device 100 determines whether an input command indicates to enter the bridge mode (S13). When the input command does not provide an indication to enter the bridge mode, the semiconductor device 100 determines whether the input command is a timeout setting command (S14), and if so, the semiconductor device 100 stores an ATTN hold time AHT and a FLASH_CS delay time FCDT set by the timeout setting command (S16). When the input command is not a timeout setting command, the semiconductor device 100 goes back to the command waiting loop (S30 to S12), after identifying and executing the input command the input command (S15). When the input command is a command which provides an indication to enter the bridge mode, the semiconductor device 100 issues an interrupt request signal ATTN (S18) after disenabling the second communication interface circuitry 32 by writing "0" into the SPI master enable register 63 in the second communication interface circuitry 32 (S17), and writes "1" into the chip select level setting register 61 (S19) at time t5.

The ATTN hold time AHT is a waiting time after the semiconductor device 100 issues the interrupt request signal ATTN until the semiconductor device 100 enters the bridge mode. The interrupt request signal ATTN output from the semiconductor device 100 functions as a response to a request to enter the bridge mode from the host-side board 300, and the ATTN hold time AHT provides a time margin for the host-side board 300 to surely receive the response. The FLASH_CS delay time FCDT is based on a delay time after the semiconductor device 100 enters the bridge mode until the semiconductor device 100 enables the chip select signal of the non-volatile memory 103. In one embodiment, when the frequency of the SPI clock is 4 MHz, for example, the FLASH_CS delay time FCDT may be set longer than 250 ns.

When receiving the interrupt request signal ATTN (S55), the host-side board 300 switches the bus select signal bus_select output from the general-purpose output terminal 78 to select the SPI communication to achieve the bridge mode, by controlling the general-purpose IC port 314 (S56) and sends a write enable command to allow writing into the non-volatile memory 103 from the third communication interface circuitry 312 (S58), after waiting for expiration of the ATTN hold time AHT and the FLASH_CS delay time (S57) from time t6 to t9.

The semiconductor device 100 writes "1" into the bridge mode setting register (io_bridge_mode) 62 (S21) at time t7, after waiting for expiration of the ATTN hold time AHT (S20) from time t5 to t7, and then writes "0" into the chip select level setting register (S23) from time t9 to t10, after waiting for expiration of the FLASH_CS delay time FCDT from time t7 (S22).

Subsequently, the host-side board 300 performs a hardware reset on the semiconductor device 100 (S59) at time t11.

In response to the reset of the semiconductor device 100, the procedure of the boot program illustrated in FIG. 5 goes back to the beginning, and the procedure illustrated in FIG. 7 also goes back to the beginning.

The host-side board 300 reads out the status of the semiconductor device 100 again (S60) from time t1 to t2, after terminating the hardware reset (S59) of the semiconductor device 100 at time t1.

The semiconductor device 100 starts the boot program again, and goes to the recovery mode (S10) to enter a command waiting loop (S12 to S30), since the write operation has been already enabled.

The host-side board 300 goes to the abnormal boot (S62) when the status of the semiconductor device 100 is not in the fallback mode. When the semiconductor device 100 is in the fallback mode, the host-side board 300 subsequently issues a command to enter the bridge mode (S63) from time t2 to t4, and then enters a loop for waiting an interrupt request signal ATTN from the semiconductor device 100 (S64) from time t4 to t5.

While being placed in the command waiting loop (S12 to S30), the semiconductor device 100 determines whether an input command indicates to enter the bridge mode (S13). When the input command does not indicate to enter the bridge mode, the semiconductor device 100 determines whether the input command is a timeout setting command (S14), and if so, the semiconductor device 100 stores therein an ATTN hold time AHT and a FLASH_CS delay time FCDT set by the command (S16). When the input command is not a timeout setting command, the semiconductor device 100 goes back to the command waiting loop (S30 to S12), after identifying and executing the input command (S15). When the input command is a command which indicates to enter the bridge mode, the semiconductor device 100 issues an interrupt request signal ATTN (S18) after disenabling the second communication interface circuitry 32 by writing "0" into the SPI master enable register 63 in the second communication interface circuitry 32 (S17), and writes "1" into the chip select level setting register 61 (S19) at time t5.

When receiving the interrupt request signal ATTN (S64), the host-side board 300 enters the bridge mode (S65), and performs data writing into the non-volatile memory 103 from the third communication interface circuitry 312 (S67), after waiting for expiration of the ATTN hold time AHT and the FLASH_CS delay time (S66) from time t6 to t9. The host-side board 300 determines whether the written data is the last data (S68). Since there is a restriction that the data writing into the non-volatile memory 103 is performed in units of pages, blocks or the like, one data write operation does not necessarily complete writing of all the data to be written. In various embodiments, when a write operation is completed (S67), the host-side board 300 determines whether the written data is the last data (S68) and then performs a hardware reset on the semiconductor device 100 (S69 or S74) at time t11.

In response to the reset of the semiconductor device 100, the procedure of the boot program illustrated in FIG. 5 goes back to the beginning, and the procedure illustrated in FIG. 7 also goes back to the beginning.

When the written data is the last data, the host-side board 300 terminates the hardware reset (S69) of the semiconductor device 100 at time t1, and reads out the status of the semiconductor device 100 again (S70) from time t1 to t2. After the last data is normally written, the procedure goes to the normal boot (S31), because the firmware is completely installed on the non-volatile memory 103. When the writing has failed due to some reason, however, the semiconductor device 100 goes to the recovery mode (S10) and enters a command waiting loop (S12 to S30). The host-side board 300 determines the writing is successfully completed when the status of the semiconductor device 100 is not in the fallback mode (S72), and determines the writing has failed when the status of the semiconductor device 100 is in the fallback mode (S73).

In various embodiments, when the written data is not the last data, the host-side board 300 terminates the hardware reset (S74) of the semiconductor device 100 at time t1, and reads out the status of the semiconductor device 100 again (S75) from time t1 to t2. At this moment, the semiconductor device 100, which has already entered the recovery mode (S10), is placed in a command waiting loop (S12 to 30). The host-side board 300 goes to the abnormal boot (S77) when the status of the semiconductor device 100 is not in the fallback mode. When the semiconductor device 100 is in the fallback mode, the host-side board 300 subsequently issues a command to enter the bridge mode (S78) from time t2 to t4, and then enters a loop for waiting an interrupt request signal ATTN from the semiconductor device 100 (S79) from time t4 to t5.

While being placed in the command waiting loop (S12 to S30), the semiconductor device 100 determines whether an input command indicates to enter the bridge mode (S13). When the input command does not indicate to enter the bridge mode, the semiconductor device 100 determines whether the input command is a timeout-setting command (S14), and if so, the semiconductor device 100 stores therein an ATTN hold time AHT and a FLASH_CS delay time FCDT (FLASH_SPI_CSN delay time) indicated by the timeout setting command (S16). When the input command is not a timeout setting command, the semiconductor device 100 goes back to the command waiting loop (S30 to S12), after identifying and executing the input command (S15). When the input command is a command which indicates to enter the bridge mode, the semiconductor device 100 issues an interrupt request signal ATTN (S18) after disenabling the second communication interface circuitry 32 by writing "0" into the SPI master enable register 63 in the second communication interface circuitry 32 (S17), and writes "1" into the chip select level setting register 61 (S19) at time t5.

When receiving the interrupt request signal ATTN (S79), the host-side board 300 enters the bridge mode (S80), and reads out status bits of the non-volatile memory 103 (S82), after waiting for expiration of the ATTN hold time AHT and the FLASH_CS delay time (S81) from time t6 to t9. When the status bits indicate "busy", the procedure returns to the hardware reset at step S74. Otherwise, the procedure proceeds to the hardware reset at step S84. The host-side board 300 terminates the hardware reset (S84) of the semiconductor device 100 at time t1, and reads out the status of the semiconductor device 100 again (S85) from time t1 to t2. The host-side board 300 goes to the abnormal boot (S87) when the status of the semiconductor device 100 is not in the fallback mode. When the semiconductor device 100 is in the fallback mode, the procedure goes back to the issuance of a command to enter the bridge mode (S54) from time t2 to t4, to continue the data writing into the non-volatile memory 103 (S63 to S68).

Both of the host-side board 300 and the semiconductor device 100 are placed in the bridge mode through the above-described procedure, and data writing into the non-volatile memory 103 is successfully achieved from the main controller 301 of the host-side board 300 through the third communication interface 312.

Figure 8:
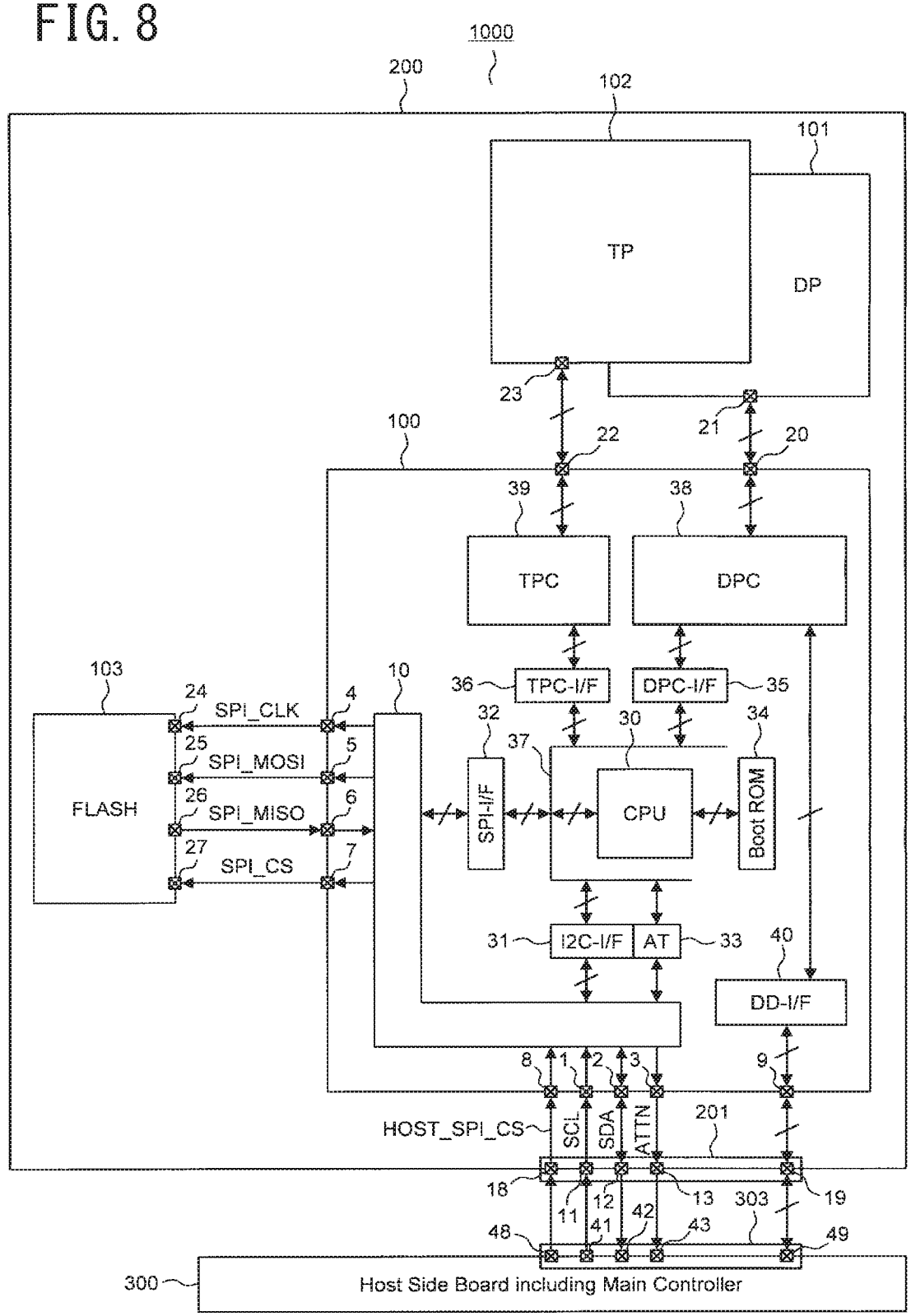
FIG. 8 is a configuration example of an electronic appliance according to one or more embodiments of the disclosure.

FIG. 8 is a block diagram illustrating a configuration example of the electronic appliance 1000 in a second embodiment. As compared to the embodiment illustrated and described with regard to FIG. 1, the embodiment of FIG. 8 the semiconductor device 100 further includes a chip select reception terminal 8 configured to receive a chip select signal HOST_SPI_CS, the human interface device 200 further includes a chip select reception terminal 18 corresponding to the chip select reception terminal 8 in the connector 201, and the host-side board 300 further includes a host-side SPI chip select terminal 48 corresponding to the chip select reception terminal 18 in the connector 303. The configuration of the rest is similar to that illustrated and described with regard to the embodiment of FIG. 1 and no detailed description is given.

Figure 9:
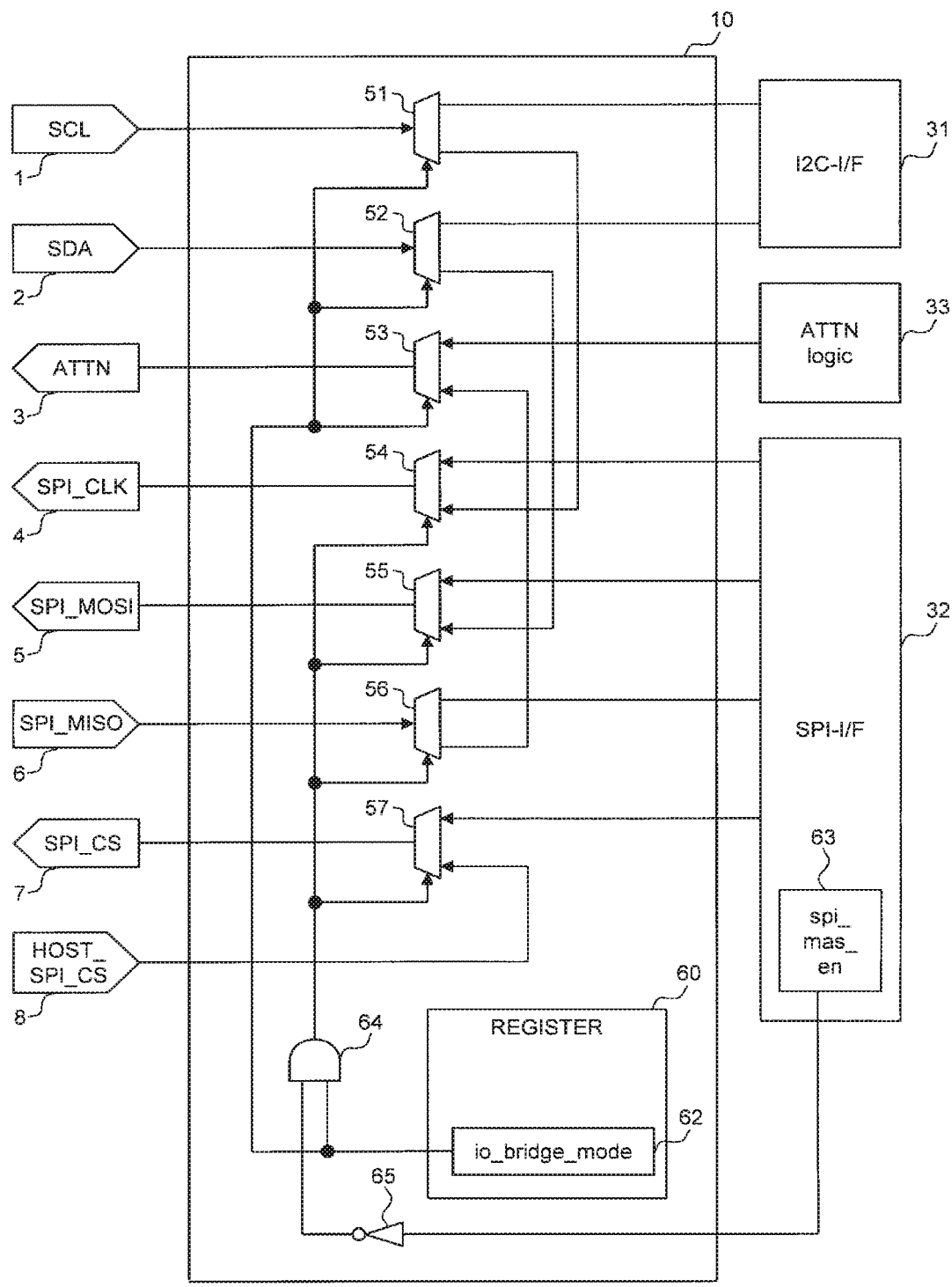
FIG. 9 is a configuration example of a bridge circuitry according to one or more embodiments of the disclosure.

FIG. 9 is a block diagram illustrating a configuration example of the bridge circuitry 10. As compared to the embodiment illustrated and described with regard to FIG. 3, the bridge circuitry described and illustrated with regard to FIG. 9 exists in that the chip select signal HOST_SPI_CS input from the chip select reception terminal 8 is supplied to the switch 57 in place of the chip select level setting register 61. The configuration of the rest is similar to that illustrated in FIG. 3 and no detailed description is given.

Figure 10:
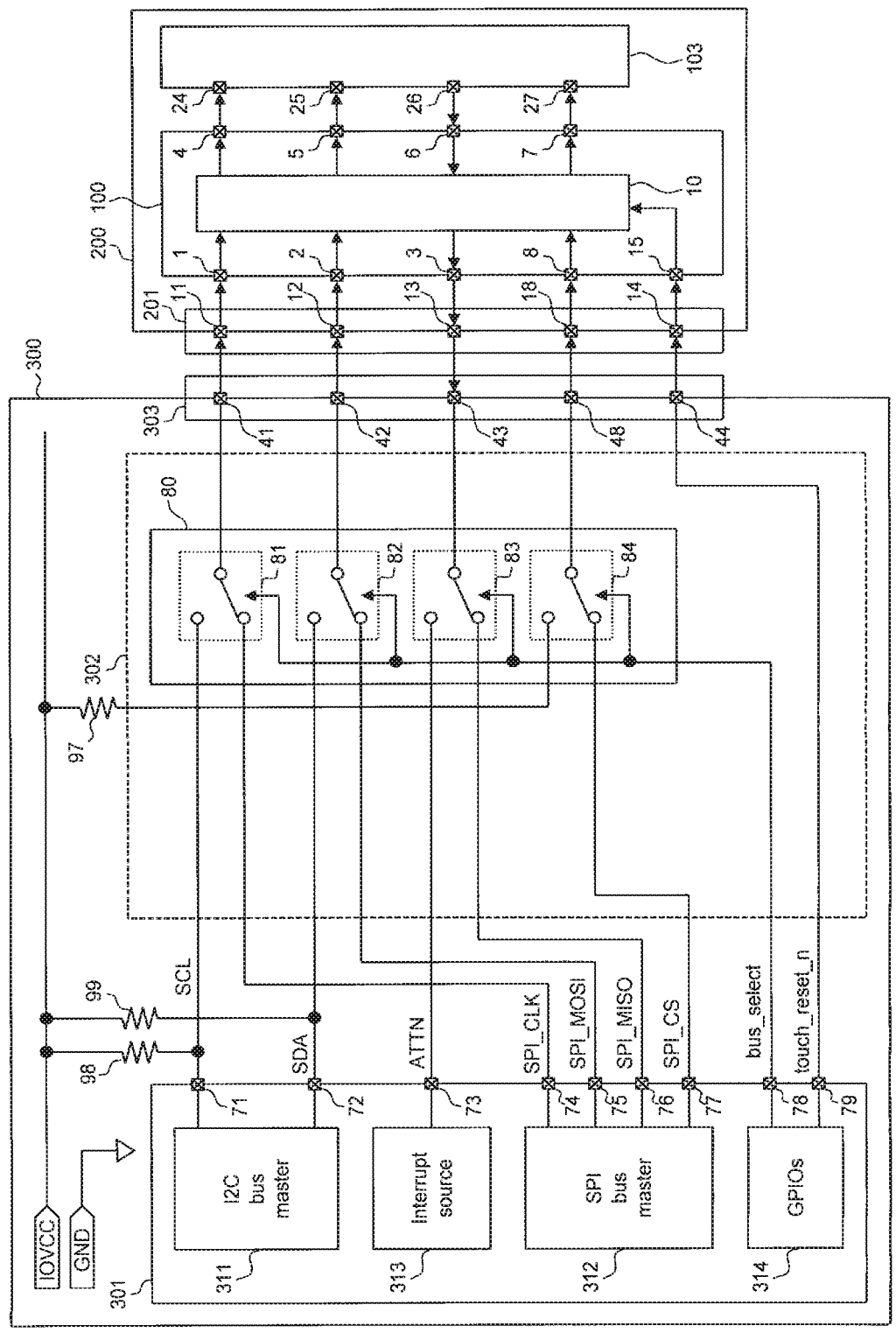
FIG. 10 is a block diagram illustrating a configuration example of a host-side board according to one or more embodiments of the disclosure.

FIG. 10 is a block diagram illustrating a configuration example of the host-side board 300. As compared to the embodiment of FIG. 4, in the embodiment of FIG. 10 the connector 303 further includes the host-side SPI chip select terminal 48 and a routing trace is additionally disposed to connect the host-side chip select terminal 77 of the main controller 301 to the host-side SPI chip select terminal 48 via the switch 84, which is not used in the configuration illustrated in FIG. 4, when the electronic appliance 1000 is placed in the bridge mode. The other input of the switch 84 is fixed to the high level by a pull-up resistor 97, so as not to erroneously assert the chip select signal. This applies to the case when the chip select signal of the non-volatile memory 103 is low-active; when the chip select signal of the non-volatile memory 103 is high-active, the other input of the switch 84 is fixed to the low level. The configuration of the rest is similar to that illustrated in FIG. 4 and no detailed description is given.

This configuration effectively reduces the duration of time for writing into the non-volatile memory from the external control device (main controller), while suppressing an increase in the number of terminals of the connector of the display connected to the external control device (main controller), when the semiconductor device (controller) is incorporated in the display, electrically connected to the non-volatile memory and to a stack of a display panel and a touch panel or a display touch panel.

In one embodiment, the semiconductor device 100 is reset (S59, S69, S74 and S84) to deassert the chip select terminal 7 of the semiconductor device 100 (the chip select terminal 27 of the non-volatile memory 103) from the host-side board 300. In another embodiment, the host-side board 300 can directly deassert the chip select terminal 7 of the semiconductor device 100 by adding one terminal to the connectors 201 and 303. This allows deasserting the chip select terminal 7 (the chip select terminal 27 of the non-volatile memory 103) in place of the hardware resets (S59, S69, S74 and S84) illustrated in FIG. 6. This eliminates an overhead caused by the hardware resets, and further reduces the duration of time required for writing into the non-volatile memory from the external control device (main controller).

In the above embodiments, as indicated by step S55 in FIG. 6 and the period from time t4 to t5 in FIG. 7, the main controller 301 of the host-side board 300 is programmed to perform the process to enter the bridge mode (S56), after waiting for an assertion of the interrupt request signal ATTN by the semiconductor device 100. The process of waiting for an assertion of the interrupt request signal ATTN by the semiconductor device 100 may be instead implemented by hardware in the bridge circuitry 302 of the host-side board 300.

FIG. 11 is a block diagram illustrating a configuration example of the host-side board 300 according another embodiment. In such an embodiment, a mode signal MODE is output from the general-purpose output terminal 78 of the main controller 301 in place of the bus select signal bus_select. The bridge circuitry 302 additionally includes a latch 90 and an inverter 95. The mode signal MODE is supplied to the data input terminal D and the clear terminal CLR of the latch 90. The interrupt request signal ATTN supplied to the terminal 43 is inverted by the inverter 95 and then input to the clock input terminal of the latch 90. The output signal from the data output terminal Q of the latch 90 is supplied to the select control terminals of the switches 81 to 84 in place of the bus select signal bus_select.

Although this eliminates the need of performing step S55 of the flowchart illustrated in FIG. 6, the operation in this embodiment is similar to that of the embodiment illustrated and described with relation to FIG. 7. Even when the mode signal MODE is immediately set to the high level at time t3 without waiting for an assertion of the interrupt request signal ATTN from the semiconductor device 100, the bus select signal bus_select, which is the output signal of the latch 90, remains unchanged until the interrupt request signal ATTN is received; the host-side board 300 continues the normal operation until time t5. When the interrupt request signal ATTN is received from the semiconductor device 100 at time t5, the latch 90 latches the mode signal MODE and causes the host-side board 300 to enter the bridge mode by switching the switches 81 to 83.

In the above embodiments, the host-side bridge circuitry 302 includes a general-purpose IC integrating four single pole double throw (SPDT) switches 81 to 84, the host-side bridge circuitry 302 may instead include a general-purpose IC integrating two SPDT switches 81 and 82.

Figure 12:
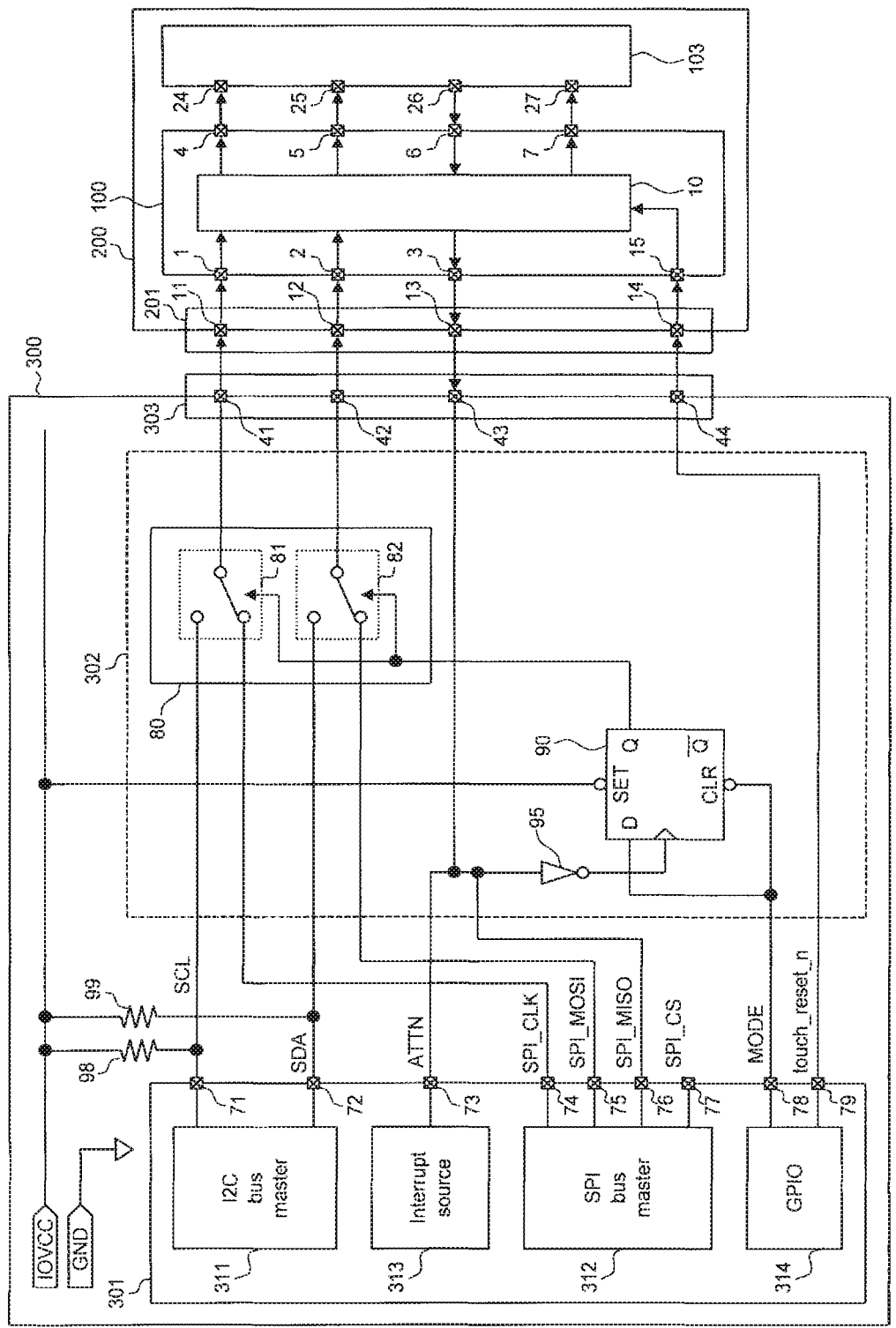
FIG. 12 is a block diagram illustrating a configuration example of a host-side board according to one or more embodiments of the disclosure.

FIG. 12 is a block diagram illustrating a configuration example of the host-side board 300 in another embodiment. A difference from the host-side bridge circuitry 302 illustrated in FIG. 11 exists in that the general-purpose IC 80 incorporates two SPDT switches 81 and 82, and, along with this, the interrupt request signal ATTN input to the terminal 43 is supplied to the interrupt request reception terminal 73 of the main controller 301 and the host-side data input terminal 76. As is the case with the host-side bridge circuitry 302 illustrated in FIG. 11, the interrupt request signal ATTN is inverted by the inverter 95 and then input to the clock input terminal of the latch 90, and the output signal from the data output terminal Q of the latch 90 is supplied to the select control terminals of the switches 81 and 82.

In the embodiment illustrated in FIG. 12, the general-purpose output terminal 78 of the main controller 301 outputs the mode signal MODE in place of the bus select signal bus_select as is the case with FIG. 11. Alternatively, the SPDT switches 81 and 82 may be controlled by the bus select signal bus_select as is the case with the embodiments illustrated in FIGS. 4 and 9. In the above embodiments, the configuration of the host-side bridge circuitry 302 may be simplified as compared to other implementations.

In another embodiment, the semiconductor device 100 further has the functions of outputting a flash status read command (Read_Flash_Status) and a write enable command (Flash_Write_Enable), differently from the first embodiment, in which the host-side board 300 transmits the write enable command to the non-volatile memory 103 from the third communication interface circuitry 312 after the host-side board 300 enters the bridge mode (S58 in FIG. 6).

The hardware configuration of this embodiment is similar to those described in the earlier described embodiments and no detailed illustration and description are given.

Figure 13:
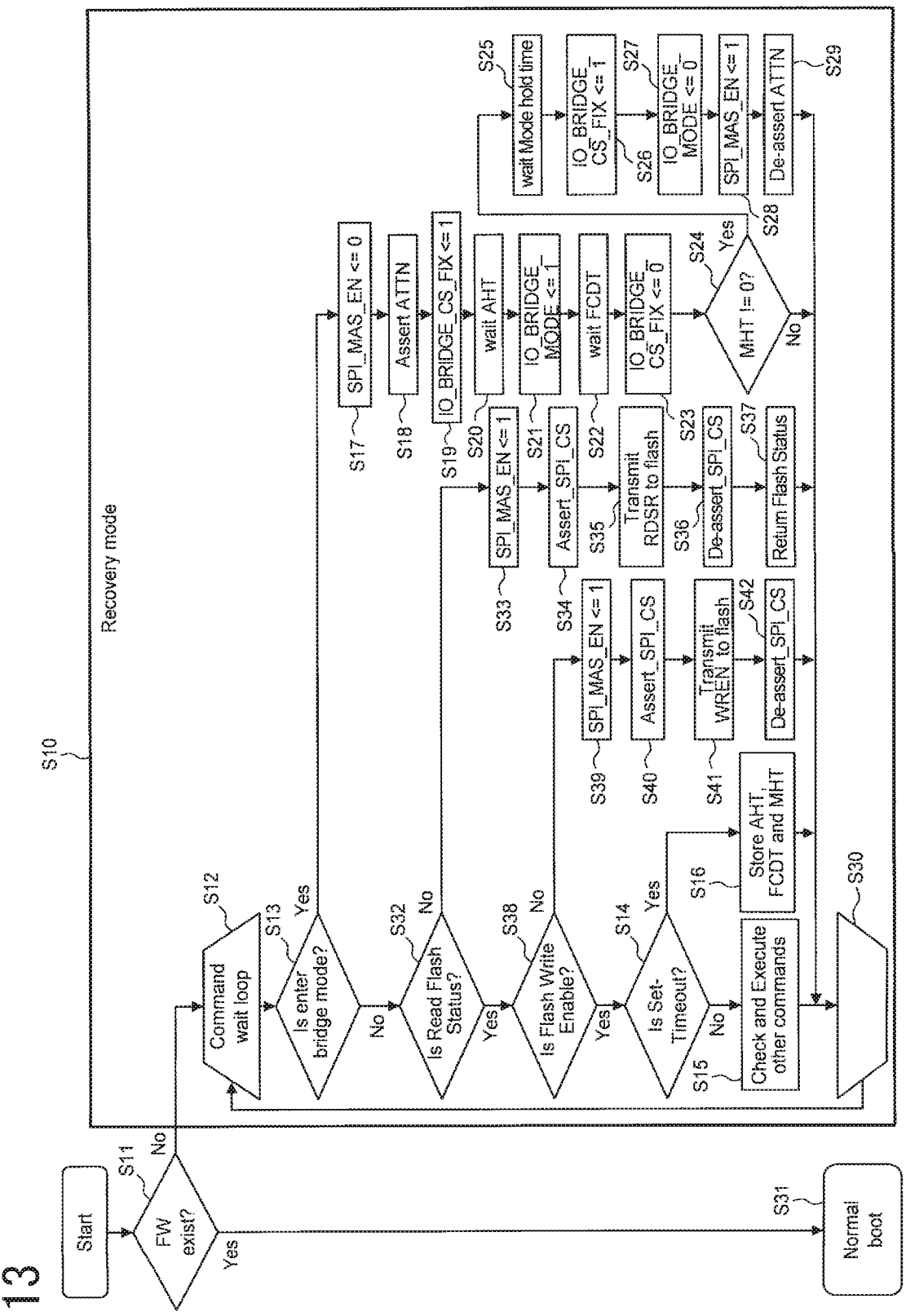
FIG. 13 is a flowchart illustrating an operation example of the semiconductor device when a boot program is executed according to one or more embodiments of the disclosure.
Figure 14:
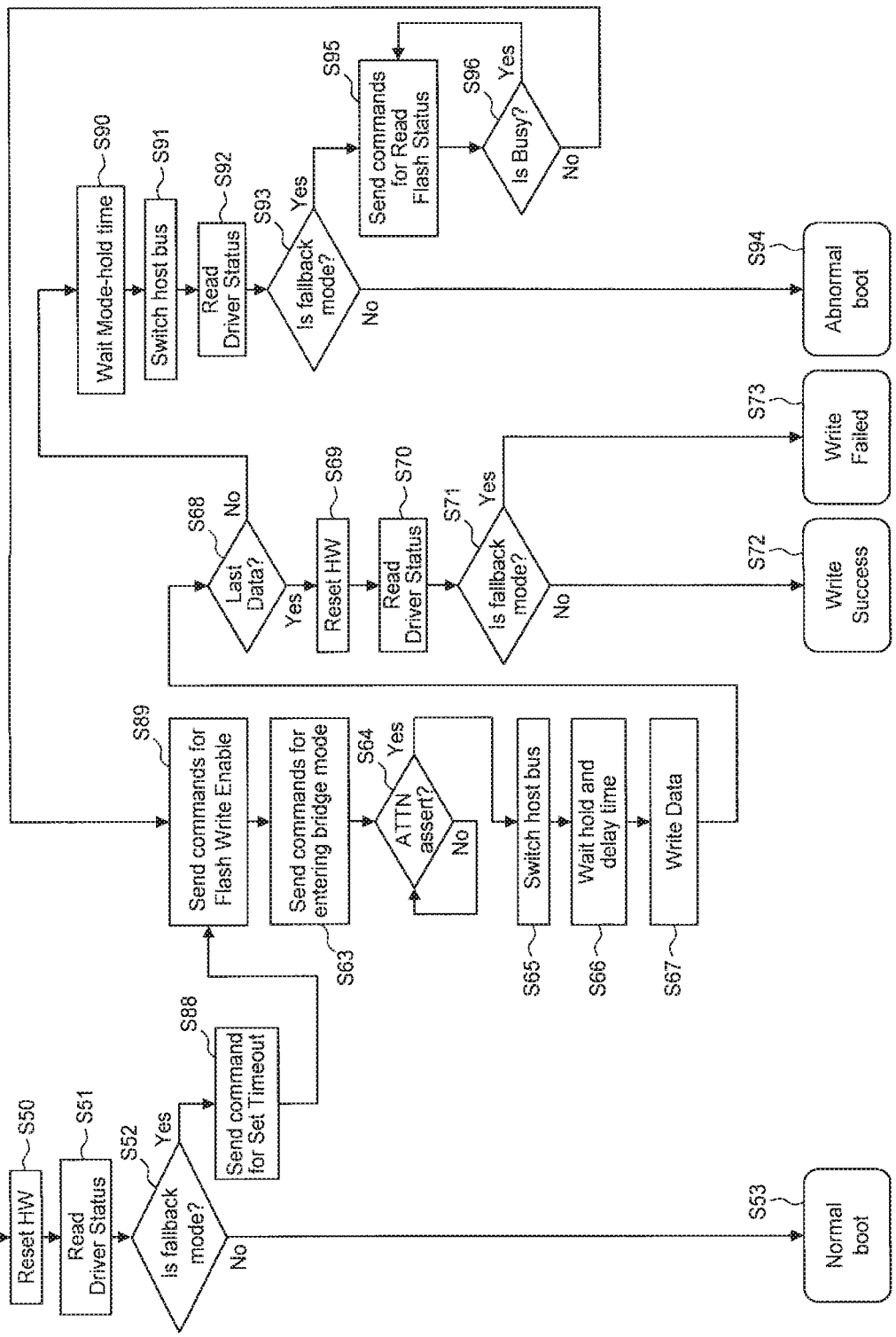
FIG. 14 is a flowchart illustrating an operation example of a host-side main controller in controlling the bridge circuitry according to one or more embodiments of the disclosure.

FIG. 13 is a flowchart illustrating an operation example of the semiconductor device 100 of according to an embodiment of the disclosure, when the boot program is executed, and FIG. 14 is a flowchart illustrating an operation example of the host-side main controller 301 in controlling the bridge circuitry 302. FIG. 15 is a timing chart illustrating the operations of the semiconductor device 100 and the host-side main controller 301.

As illustrated in FIG. 14, after terminating the hardware reset of the semiconductor device 100 (S50) at time t1, the host-side board 300 switches the bus select signal bus select to select the I2C communication, and performs the I2C communication with the first communication interface circuitry 311 via the first clock terminal 71, the serial clock terminal 11, the first clock terminal 1, the first host-side data terminal 72, the data transfer terminals 12, 2 and the interrupt request reception terminal 73 and the interrupt request terminals 13 and 3 to read out the status of the semiconductor device 100 (S51) from time t1 to time t2.

Meanwhile, the semiconductor device 100 starts executing the boot program, and accesses to the non-volatile memory 103 via the second clock terminal 4, the data output terminal 5, the data input terminal 6 and the chip select terminal 7, to thereby check whether or not data such as firmware have been already written into the non-volatile memory 103 (S11) as illustrated in FIG. 13. When the data such as firmware have been already written, the semiconductor device 100 goes to a normal boot (S31). When no data have been written, the semiconductor device 100 goes to a recovery mode (S10) and the procedure enters a command waiting loop (S12 to S30).

The operation until this moment is similar to that of the embodiments described with reference to FIGS. 5 to 7.

The host-side board 300 goes to a normal boot (S53) when the status of the semiconductor device 100 is not in the fallback mode. When the semiconductor device 100 is in the fallback mode, the host-side board 300 subsequently issues a timeout setting command by the first communication interface circuitry (S88) at time t2, a command to place the non-volatile memory 103 into a write enable state (S89) at time t12, and a command to enter the bridge mode (S63) at time t3, and then enters a loop for waiting the interrupt request signal ATTN from the semiconductor device 100 (S64) from time t4 to t5.

While being placed in the command waiting loop (S12 to S30), the semiconductor device 100 performs a process in response to an input command.

The operation of the semiconductor device 100 for the case when the input command indicates to enter the bridge mode (S13, S17 to S29) will be described later.

In various embodiments, when the input command is a flash status read command (Read_Flash_Status) (S32), the semiconductor device 100 enables the second communication interface circuitry 32 by writing a value "1" into the SPI master enable register 63 of the second communication interface circuitry 32 (S33), asserts the chip select terminal 7 (S34), and sends a read status command (RDSR: read status of flash device) to the non-volatile memory 103 (S35). The read status command (RDSR) is defined as 0x05 in the hexadecimal notation, for the case when a standard flash memory is used as the non-volatile memory 103. After reading out the status of the non-volatile memory 103, the semiconductor device 100 deasserts the chip select terminal 7 (S36), informs the host-side board 300 of the status of the non-volatile memory 103 (S37), and returns to the command waiting loop (S12 to S30).

When the input command is a write enable command (Flash_Write_Enable) (S38), the semiconductor device 100 asserts the chip select terminal 7 (S40) after enabling the second communication interface circuitry 32 (S39) by writing "1" into the SPI master enable register (spi_mas_en) 63 in the second communication interface circuitry 32, and transmits a write enable command (WREN: write enable for flash device) to the non-volatile memory 103 (S41). The write enable command (WREN) is defined as 0x06 in the hexadecimal notation, for the case when a standard flash memory is used as the non-volatile memory 103. Subsequently, the semiconductor device 100 100 deasserts the chip select terminal 7 (S42) and returns to the command waiting loop (S12 to S30).

When the input command is a timeout setting command (S14), the semiconductor device 100 stores therein an ATTN hold time AHT, a FLASH_CS delay time FCDT (FLASH_SPI_CSN delay time) and a MODE hold time HMT set by the timeout setting command (S16). If not so, the semiconductor device 100 returns to the command waiting loop (S30 to S12), after identifying and executing the input command (S15).

The MODE hold time MHT is a parameter indicating the duration of time during which the semiconductor device 100 is kept in the bridge mode.

When the input command indicates to enter the bridge mode (S13), the semiconductor device 100 issues an interrupt request signal ATTN (S18) after disenabling the second communication interface circuitry 32 by writing "0" into the SPI master enable register 63 in the second communication interface circuitry 32 (S17), writes "1" into the chip select level setting register 61 (S19) at time t5.

When receiving the interrupt request signal ATTN (S64) at time t5, the host-side board 300 switches the bus select signal bus_select output from the general-purpose output terminal 78 to select the SPI communication, which is used in the bridge mode, by controlling the general-purpose IO port 314 (S65). In an alternative embodiment, the mode signal MODE may be output from the general-purpose output terminal 78 of the main controller 301 in place of the bus select signal bus_select as is the case with the third embodiment, and the mode signal MODE output from the general-purpose output terminal 78 may be switched to the high level to select the bridge mode by controlling the general-purpose IO port 314 (S65).

Meanwhile, the semiconductor device 100 writes "1" into the bridge mode setting register (io_bridge_mode) 62 (S21) at time t7 after waiting for expiration of the ATTN hold time AHT (S20) from time t5 to t7, and writes "0" into the chip select level setting register 61 (S23) at time t8, after waiting for expiration of the FLASH_CS delay time FCDT from time t7. The semiconductor device 100 determines whether or not the MODE hold time MHT is "0" (S24), and when the MODE hold time MHT is "0", the semiconductor device 100 returns to the command waiting loop (S12 to S30). If not so, the semiconductor device 100 writes "1" into the chip select level setting register 61 (S26) after expiration of the MODE hold time MHT (S25) from time t8 to t10, writes "0" into the bridge mode setting register 62 (S27), deasserts the interrupt request signal ATTN (S29), after disenabling the second communication interface circuitry 32 (S28) by writing "1" into the SPI master enable register 63 in the second communication interface circuitry 32, and returns to the command waiting loop (S12 to S30).

Meanwhile, the host-side board 300 transmits write data to the non-volatile memory 103 from the third communication interface circuitry 312 (S67), after waiting for expiration of the ATTN hold time AHT and the FLASH_CS delay time FCDT (S66) from time t6 to t9. When this data writing completes the writing of the last data (S68), the host-side board 300 reads out the status of the semiconductor device 100 (S70) after performing a hardware reset of the semiconductor device 100 (S69). The host-side board 300 determines that the data writing is successfully completed (S72), when the status of the semiconductor device 100 is not in the fallback mode. When the status of the semiconductor device 100 is the fallback mode, the host-side board 300 determines the data writing has failed (S73) (this process is not illustrated in the timing chart of FIG. 15). When the write data is not the last data, after waiting for expiration of the MODE hold time MHT (S90) from time t8 to t10, the host-side board 300 switches the bus select signal bus_select output from the general-purpose output terminal 78 to select the I2C communication (S91) by controlling the general-purpose IO port 34, and reads out the status of the semiconductor device 100 (S92) at time t13. When the status of the semiconductor device 100 is not in the fallback mode, the host-side board 300 goes to the abnormal boot (S94). When the status of the semiconductor device 100 is in the fallback mode, the host-side board 300 directly reads out the status of the non-volatile memory 103 (S95) at time t13, by using a flash status read command (ReadFlashStatus).

As thus described, in one or more embodiments above, the mode of the semiconductor device 100 is switched by using the MODE hold time MHT and the read status command of the non-volatile memory 103 is issued from the host-side board 300. This eliminates the need of mode switching through hardware reset (S74), which is performed in the first to third embodiments, and further reduces the duration of time required for writing into the non-volatile memory from the external control device (main controller).

Although various embodiments have been specifically described, a person skilled in the art would appreciate that the technologies disclosed herein may be implemented with various modifications.

For example, although the control circuitry in the semiconductor device 100 incorporates the CPU 30, the boot ROM 34, the bus 37 and the interface circuitries 31, 32, 33, 35 and 36 in the above-described configuration examples, a hardware sequencer may be used in place of the CPU 30. The specification and drawings disclose merely examples of the allocation of the functions to respective logic circuitries, which may be modified as desired. Also the specification and drawings disclose merely examples of the selections between the positive logic and the negative logic and between the high active and the low active for each of the logic circuitries and signals, which may be modified as desired.

What is claimed is:
1. A semiconductor device, comprising:
 a first data terminal configured to connect to an external control device;
 a data output terminal configured to connect to a non-volatile memory (NVM);

control circuitry configured to control a human interface panel;

a first communication interface configured to provide first serial communication between the control circuitry and the external control device;

a second communication interface circuitry configured to provide second serial communication between the control circuitry and the NVM, the second serial communication being high-speed relative to the first serial communication; and bridge circuitry configured to:
in a normal mode: connect the first data terminal to the first communication interface, and connect the data output terminal to the second communication interface; and
in a bridge mode: connect the first data terminal to the data output terminal such that the external control device has direct high-speed access to the NVM.

2. The semiconductor device according to claim 1, further comprising:
an interrupt request terminal configured to connect to the external control device;
a data input terminal configured to connect to the NVM; and
interrupt request circuitry configured to issue an interrupt request signal to the external control device,
wherein the bridge circuitry is further configured to:
in the normal mode: connect the interrupt request terminal to the interrupt request circuitry and the data input terminal to the second communication interface; and
in the bridge mode: connect the data input terminal to the interrupt request terminal.

3. The semiconductor device according to claim 2, wherein, in the normal mode, first data are transferred between the first communication interface and the external control device via the first data terminal, second data is transferred from the second communication interface to the NVM via the data output terminal, and third data is transferred from the NVM to the second communication interface.

4. The semiconductor device according to claim 1, further comprising:
a chip select terminal configured to connect to the NVM, wherein the bridge circuitry is further configured to output a signal level to the chip select terminal to select the NVM.

5. The semiconductor device according to claim 1, further comprising:
a first clock terminal configured to connect to the external control device; and
a second clock terminal configured to connect to the NVM,
wherein the bridge circuitry is further configured to:
in the normal mode, connect the first clock terminal to the first communication interface and connect the second clock terminal to the second communication interface; and
in the bridge mode, connect the first clock terminal to the second clock terminal.

6. The semiconductor device according to claim 1, wherein the first serial communication is an Inter-Integrated Circuit (I2C) communication in which the external control device operates as a master and the semiconductor device operates as a slave, and wherein the second serial communication is a Serial Peripheral Interface (SPI) communication in which the semiconductor device operates as a master and the non-volatile memory operates as a slave.

7. The semiconductor device according to claim 4, wherein the bridge circuitry comprises a chip select level setting register configured to control the signal level on the chip select terminal to select the NVM in the bridge mode.

8. The semiconductor device according to claim 4, further comprising: a selection control terminal configured to connect to the external control device,
wherein the bridge circuitry is further configured to connect the chip select terminal and the selection control terminal in the bridge mode.

9. A human interface device, comprising:
a human interface panel comprising at least one of a display panel, a touch panel and a display touch panel;
a NVM; and
a semiconductor device comprising:
a first data terminal configured to connect to an external control device;
a data output terminal configured connected to the NVM;
control circuitry configured to control the human interface panel;
a first communication interface configured to provide first serial communication between the control circuitry and the external control device;
a second communication interface configured to provide second serial communication between the control circuitry and the NVM, the second serial communication being high-speed relative to the first serial communication; and
bridge circuitry configured to:
in a normal mode: connect the first data terminal to the first communication interface, and connect the data output terminal to the second communication interface; and
in a bridge mode: connect the first data terminal to the data output terminal, to provide the external control device with direct high-speed access to the NVM.

10. The human interface device according to claim 9, further comprising:
an interrupt request terminal configured to connect to the external control device;
a data input terminal connected to the NVM; and
an interrupt request circuitry configured to issue an interrupt request signal to the external control device,
wherein the bridge circuitry is further configured to:
in the normal mode, connect the interrupt request terminal to the interrupt request circuitry and connect the data input terminal to the second communication interface; and
in the bridge mode, connect the data input terminal to the interrupt request terminal.

11. The human interface device according to claim 9,
wherein the first serial communication is an I2C communication in which the external control device operates as a master and the semiconductor device operates as a slave,
wherein the second serial communication is an SPI communication in which the semiconductor device operates as a master and the NVM operates as a slave.

12. An electronic appliance, comprising:
a host-side connector;
host-side bridge circuitry;
a main controller, comprising:
   a first host-side data terminal configured for first serial communication with a semiconductor device; and
   a host-side data output terminal configured for third serial communication with a NVM in accordance with a same communication specification as a second serial communication,
wherein the host-side bridge circuitry is configured to:
   connect the first-host side data terminal to a first data terminal of the semiconductor device in a normal mode, and
   connect the host-side data output terminal to the first data terminal of the semiconductor device in a bridge mode; and
a human interface device comprising:
   a human interface panel comprising at least one of a display panel, a touch panel and a display touch panel;
   a NVM; and
   a semiconductor device connected to: the human interface panel;
   the NVM; the main controller connected via the host-side connector; and the host-side bridge circuitry, the semiconductor device comprising:
      a first data terminal connected to the host-side connector;
      a data output terminal connected to the NVM;
      control circuitry;
      a first communication interface configured to provide:
         first serial communication between the control circuitry and an external control device; and
         a second communication interface configured to provide second serial communication between the control circuitry and the NVM; and
         module-side bridge circuitry configured to:
            in a normal mode, connect the first data terminal to the first communication interface and connect the data output terminal to the second communication interface; and
            in a bridge mode, connect the first data terminal to the data output terminal.

13. The electronic appliance according to claim 12,
wherein the semiconductor device further comprises:
an interrupt request terminal connected to the external control device;
a data input terminal connected to the NVM; and
an interrupt request circuitry configured to issue an interrupt request signal to the external control device,
wherein the module-side bridge circuitry is further configured to:
   in the normal mode, connect the interrupt request terminal to the interrupt request circuitry and connect the data input terminal to the second communication interface; and
   in the bridge mode, wherein the module-side bridge circuitry is configured to connect the data input terminal to the interrupt request terminal,
wherein the main controller further comprises:
   an interrupt request reception terminal; and
   a host-side data input terminal used for the third serial communication with the NVM,
wherein the host-side bridge circuitry is configured to:
   connect the interrupt request reception terminal to the interrupt request terminal of the semiconductor device in the normal mode, and
wherein the host-side bridge circuitry is configured to connect the host-side data input terminal to the interrupt request terminal of the semiconductor device in the bridge mode.

14. The electronic appliance according to claim 13,
wherein the semiconductor device further comprises:
   a first clock terminal connected to the external control device; and
   a second clock terminal connected to the NVM,
wherein the host-side bridge circuitry is further configured to:
   in the normal mode, connect the first clock terminal to the first communication interface and connect the second clock terminal to the second communication interface circuitry; and
   in the bridge mode, connect the first clock terminal to the second clock terminal,
wherein the main controller further comprises:
   a first host-side clock terminal used for the first serial communication;
   a second host-side clock terminal used for the third serial communication;
wherein the host-side bridge circuitry is further configured to:
   connect the first host-side clock terminal to the first clock terminal of the semiconductor device in the normal mode, and
   connect the second host-side clock terminal to the first clock terminal of the semiconductor device in the bridge mode.

15. The electronic appliance according to claim 12,
wherein the first serial communication is an I2C communication in which the external control device operates as a master and the semiconductor device operates as a slave,
wherein the second serial communication is an SPI communication in which the semiconductor device operates as a master and the NVM operates as a slave.

16. The electronic appliance according to claim 14,
wherein the semiconductor device further comprises:
   a chip select terminal connected to the NVM, and
wherein the module-side bridge circuitry is further configured to output a signal level on the chip select terminal to select the NVM in the bridge mode.

17. The electronic appliance according to claim 14,
wherein the semiconductor device further comprises:
   a chip select terminal connected to the NVM; and
   a selection control terminal connected to the host-side bridge circuitry,
wherein the plurality of module-side switch circuitries are configured to connect the chip select terminal and the selection control terminal in the bridge mode,
wherein the main controller further comprises a host-side chip select terminal, and
wherein the host-side bridge circuitry is configured to connect the selection control terminal to the host-side chip select terminal.

18. The electronic appliance according to claim 17,
wherein the main controller further comprises a bus select terminal,
wherein the host-side bridge circuitry comprises first, second, third and fourth host-side switch circuitries each comprising a double throw switch switched in response to a bus select control signal output from the bus select terminal, wherein the first host-side switch circuitry is further configured to:
  connect the first host-side clock terminal to the first clock terminal of the semiconductor device in the normal mode; and
  connect the second host-side clock terminal to the first clock terminal in the bridge mode,
wherein the second host-side switch circuitry is configured to connect the first host-side data terminal to the first data terminal of the semiconductor device in the normal mode, and connect the host-side data output terminal to the first data terminal in the bridge mode,
wherein the third host-side switch circuitry is further configured to:
  connect the interrupt request reception terminal to the interrupt request terminal of the semiconductor device in the normal mode; and
  connect the host-side data input terminal to the interrupt request terminal in the bridge mode, and
wherein the fourth host-side switch circuitry is further configured to connect the host-side chip select terminal to the selection control terminal of the semiconductor device in the bridge mode.

19. The electronic appliance according to claim 14,
wherein the main controller further comprises a mode control terminal,
wherein the host-side bridge circuitry comprises:
latch circuitry configured to: latch a mode control signal output from the mode control terminal in response to a signal input to the third host-side connector terminal; and output the latched mode control signal; and,
first, second and third host-side switch circuitries which each include a double throw switch switched in response to the latched mode control signal,
wherein the first host-side switch circuitry is further configured to: connect the first host-side clock terminal to the first clock terminal of the semiconductor device in the normal mode; and connect the second host-side clock terminal to the first clock terminal in the bridge mode,
wherein the second host-side switch circuitry is further configured to:
  connect the first host-side data terminal to the first data terminal of the semiconductor device in the normal mode, and
  connect the host-side data output terminal to the first data terminal in the bridge mode, and
wherein the third host-side switch circuitry is further configured to:
  connect the interrupt request reception terminal to the third interrupt request terminal of the semiconductor device in the normal mode; and
  connect the host-side data input terminal to the interrupt request terminal in the bridge mode.

20. The electronic appliance according to claim 14,
wherein the main controller further comprises a mode control terminal,
wherein the host-side bridge circuitry is further configured to supply a signal received from the interrupt request terminal of the semiconductor device to the interrupt request reception terminal and the host-side data input terminal,
wherein the host-side bridge circuitry comprises:
latch circuitry configured to:
  latch a mode control signal output from the mode control terminal in response to the signal received from the interrupt request terminal; and
  output the latched mode control signal; and
first and second host-side switch circuitries which each include a double throw switch switched in response to the latched mode control signal,
wherein the first host-side switch circuitry is further configured to:
  connect the first host-side clock terminal to the first clock terminal of the semiconductor device in the normal mode; and
  connect the second host-side clock terminal to the first clock terminal in the bridge mode, and
wherein the second host-side switch circuitry is further configured to:
  connect the first host-side data terminal to the first data terminal of the semiconductor device in the normal mode; and
  connect the host-side data output terminal to the first data terminal in the bridge mode.

* * * * *

UNITED STATES PATENT AND TRADEMARK OFFICE
CERTIFICATE OF CORRECTION

PATENT NO. : 10,509,595 B2  
APPLICATION NO. : 15/842543  
DATED : December 17, 2019  
INVENTOR(S) : Nobukazu Tanaka, Takayuki Noto and Masaaki Shiomura Page 1 of 1

It is certified that error appears in the above-identified patent and that said Letters Patent is hereby corrected as shown below:

In the Claims

Claim 1, Column 19, Line 6, after "interface" delete "circuitry"

Claim 14, Column 22, Line 17, after "interface" delete "circuitry"

Signed and Sealed this  
Twenty-sixth Day of May, 2020

Andrei Iancu  
*Director of the United States Patent and Trademark Office*